(12) United States Patent
Yang et al.

(10) Patent No.: US 11,345,828 B2
(45) Date of Patent: May 31, 2022

(54) SILOXANE-MODIFIED BINDERS AND COMPOSITIONS THEREOF

(71) Applicant: COLUMBIA INSURANCE CO., Omaha, NE (US)

(72) Inventors: Yong Yang, Hillsborough, NJ (US); Johanna L. Garcia De Visicaro, Lake Hopatcong, NJ (US); Luz Clarena Shavel, East Stroudsburg, PA (US); Robert Sheerin, North Caldwell, NJ (US)

(73) Assignee: COLUMBIA INSURANCE CO., Omaha, NE (US)

( * ) Notice: Subject to any disclaimer, the term of this patent is extended or adjusted under 35 U.S.C. 154(b) by 50 days.

(21) Appl. No.: 16/955,196

(22) PCT Filed: Dec. 20, 2018

(86) PCT No.: PCT/US2018/066716
§ 371 (c)(1),
(2) Date: Jun. 18, 2020

(87) PCT Pub. No.: WO2019/126449
PCT Pub. Date: Jun. 27, 2019

(65) Prior Publication Data
US 2020/0332067 A1 Oct. 22, 2020

Related U.S. Application Data

(60) Provisional application No. 62/608,991, filed on Dec. 21, 2017.

(51) Int. Cl.
| | | |
|---|---|---|
| *C08G 77/20* | (2006.01) |
| *C09D 143/04* | (2006.01) |
| *C08F 212/08* | (2006.01) |
| *C08F 220/56* | (2006.01) |
| *C08G 77/38* | (2006.01) |
| *C09D 133/08* | (2006.01) |
| *C09D 133/26* | (2006.01) |
| *C09D 183/08* | (2006.01) |
| *C08F 220/18* | (2006.01) |

(52) U.S. Cl.
CPC .......... *C09D 143/04* (2013.01); *C08F 212/08* (2013.01); *C08F 220/1804* (2020.02); *C08F 220/56* (2013.01); *C08G 77/20* (2013.01); *C08G 77/38* (2013.01); *C09D 133/08* (2013.01); *C09D 133/26* (2013.01); *C09D 183/08* (2013.01)

(58) Field of Classification Search
CPC ..... C08G 77/20; C08F 212/08; C09D 133/08; C09D 133/10; C09D 133/12; C09D 133/26; C09D 184/04; C08K 5/30
See application file for complete search history.

(56) References Cited

U.S. PATENT DOCUMENTS

| | | | |
|---|---|---|---|
| 5,852,095 A | 12/1998 | Yamauchi et al. | |
| 5,993,923 A * | 11/1999 | Lee ..................... | C08F 212/08 428/36.8 |
| 7,795,326 B2 | 9/2010 | Salamone et al. | |
| 8,980,995 B2 | 3/2015 | Yang et al. | |
| 9,040,617 B2 | 5/2015 | Yang et al. | |
| 9,688,800 B2 | 6/2017 | Sheerin et al. | |
| 2010/0144933 A1 | 6/2010 | Irie | |
| 2014/0228509 A1 | 8/2014 | Yang et al. | |
| 2016/0122575 A1 | 5/2016 | Yang et al. | |
| 2016/0319156 A1 | 11/2016 | Rathore et al. | |

OTHER PUBLICATIONS

Extended European Search Report on EP 18890393.4 dated Sep. 1, 2021 (10 pages).
International Preliminary Report on Patentability on PCT/US2018/066716 dated Jul. 20, 2020 (10 pages).
Zhang, Q., et al., "Synthesis and surface properties of PDMS-containing latexes by emulsion polymerization using AIBN as the initiator," European Polymer Journal, 49(8):2327-2333 (2013) (7 pages).
"Shin-Etsu Silicone—Modified Silicone Fluid," Shin-Etsu Chemical Co., Ltd. (2006), accessed at http://www.silicone.jp/.
International Search Report and Written Opinion in International Application No. PCT/US2018/066716, dated Apr. 12, 2019.
Keong, "What is silicon, silica, silane," Education, Products, Dec. 21, 2015, accessed at http://www.iglcoatings.com/what-is-silicon-silica-silane/.

* cited by examiner

*Primary Examiner* — Kuo Liang Peng
(74) *Attorney, Agent, or Firm* — Foley & Lardner LLP

(57) ABSTRACT

A siloxane-modified latex binder includes a polymerization product of a monomer or a mixture of monomers for producing a latex polymer and a non-hydrolyzable siloxane. The non-hydrolyzable siloxane is represented by Formula (I): wherein: $R^1$, $R^2$, $R^3$, $R^4$, $R^5$, $R^6$, $R^7$, and $R^8$ are independently hydrogen, alkyl, —O-alkyl, —OH, —S-alkyl, —SH, amino, amido, epoxy, carboxyl, acrylate, (meth)acrylate, cycloalkyl, aryl, alkalyl, polyether, alkenyl, or alkynyl; and n is an integer from 0 to about 300; provided that at least one of $R^1$, $R^2$, $R^3$, $R^4$, $R^5$, $R^6$, $R^7$, and $R^8$ is an alkenyl or alkynyl.

17 Claims, 2 Drawing Sheets

SILOXANE-MODIFIED BINDERS AND COMPOSITIONS THEREOF

CROSS-REFERENCE TO RELATED APPLICATIONS

This application is a U.S. National Phase Application under 35 U.S.C. § 371 of International Application No. PCT/US2018/066716, filed on Dec. 20, 2018, which claims the benefit of priority to U.S. Patent Application No. 62/608,991, filed on Dec. 21, 2017, which are each incorporated herein by reference.

FIELD

In general, the present technology relates to the field of binders and compositions including binders (e.g., paints and coatings). More specifically, the present technology relates to the field of siloxane-modified binders in which the siloxane group is non-hydrolyzable.

SUMMARY

In one aspect, the present technology is directed to a siloxane-modified latex binder that includes a polymerization product of a monomer or a mixture of monomers for producing a latex polymer and a non-hydrolyzable siloxane. In some embodiments, the non-hydrolyzable siloxane may be represented by Formula I:

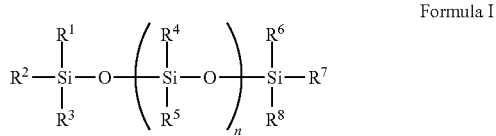

Formula I wherein $R^1$, $R^2$, $R^3$, $R^4$, $R^5$, $R^6$, $R^7$, and $R^8$ are independently hydrogen, alkyl, —O-alkyl, —OH, —S-alkyl, —SH, amino, amido, epoxy, carboxyl, acrylate, (meth)acrylate, cycloalkyl, aryl, alkaryl, polyether, alkenyl, or alkynyl; and n is an integer from 0 to about 300; provided that at least one of $R^1$, $R^2$, $R^3$, $R^4$, $R^5$, $R^6$, $R^7$, and $R^8$ is an alkenyl or alkynyl. In some embodiments, the present technology is directed to a siloxane-modified latex binder that includes a polymerization product of a monomer or a mixture of monomers for producing a latex polymer including butyl (meth)acrylate, (meth)acrylic acid, methyl (meth)acrylate, styrene, or a combination of any two or more thereof; a non-hydrolyzable siloxane represented by Formula II:

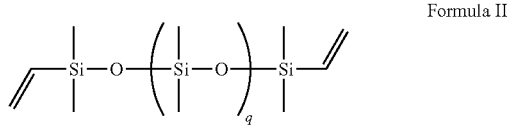

Formula II wherein q is an integer from about 60 to about 120; and a cross-linkable monomer that includes acetoacetoxyethyl methacrylate (AAEM), diacetone acrylamide (DAAM), or a combination thereof.

In another aspect, the present technology is directed to a method of producing a siloxane-modified latex binder, the method including polymerizing a monomer or a mixture of monomers to form a latex binder; contacting a non-hydrolyzable siloxane with the latex binder to produce a siloxane-modified latex binder; and polymerizing additional amounts of the monomer or the mixture of monomers.

The modified binders of the present technology are well-suited for use in a variety of coating compositions including water-based coating compositions (e.g., water-based paint). In some embodiments, the binder may be used in place of or in addition to commonly used binders (e.g., latex binders). In certain compositions, the present modified binders may further enhance one or more of the following properties: corrosion resistance, scrub resistance, blocking resistance, co-dispersion, gloss enhancement, texture enhancement, reduced foaming, hardness enhancement, solvent and/or water resistance, washability, stain resistance, low temperature coalescence and/or curing, and/or other favorable properties compared to compositions with commonly known/used latex binders. In some embodiments, binders of the present technology in coating compositions may enhance blocking resistance, improve texture (i.e., smooth feel), and/or reduce foaming compared to composition with commonly known/used latex binders. In some embodiments, the coatings may be used in different coating applications such as residential and/or industrial coating applications, architectural coating applications, automotive coating applications, outdoor furniture coating applications, exteriors and interiors of houses, and other buildings.

DETAILED DESCRIPTION

Figure 1:
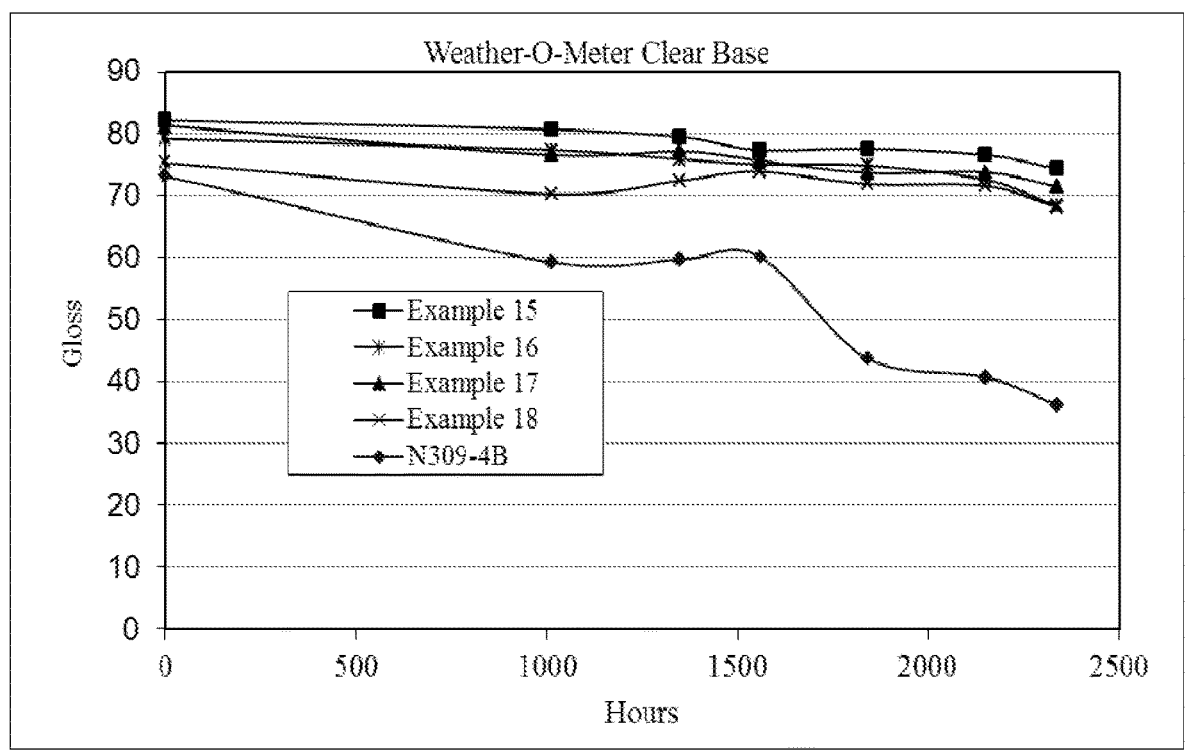
FIG. 1 provides gloss retention at 60 degrees, as measured after Weather-o-meter exposure, of illustrative clear coatings of the present technology compared to a high gloss, standard commercial paint using an acrylic/styrene binder.

The following terms are used throughout as defined below.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

In general, as used herein, "substituted" refers to an alkyl, alkenyl, alkynyl, cycloalkyl, aryl, amino, amido, ether (including epoxy), alkaryl, or polyether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; aryl; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched chain aliphatic groups (i.e., saturated hydrocarbyl chains), having from 1 to about 20 carbon atoms, and typically from 1 to 12 carbons or, in some embodiments, from 1 to 8 or 1 to 6 carbon atoms. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Unless otherwise indicated, the alkyl group is optionally substituted with 1, 2, or 3, preferably 1 or 2, more preferably 1, substituents that are compatible with the compounds, monomers, and polymers described herein. Representative substituted alkyl groups may be substituted one or more times with, for example, hydroxy, aryl, and/or halo groups such as F, Cl, Br, and I groups (e.g., hydroxyalkyl, fluoroalkyl, chloroalkyl, aralkyl). As used herein the term haloalkyl is an alkyl group having one or more halo groups. In some embodiments, haloalkyl refers to a per-haloalkyl group. In some embodiments, the alkyl group is unsubstituted.

As used herein, "alkenyl" groups include straight and branched chain and cycloalkyl groups as defined herein, except that at least one double bond exists between two carbon atoms. Thus, alkenyl groups have from 2 to about 20 including 2 to 12, 2 to 8, or 2 to 6 carbon atoms. Examples include, but are not limited to vinyl, allyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl, among others. Alkenyl groups may be substituted or unsubstituted. Representative substituted alkenyl groups may be mono-substituted or substituted more than once, such as, but not limited to, mono-, di- or tri-substituted with substituents such as those listed above. In some embodiments, alkenyl groups may be unsubstituted.

"Alkyne" or "alkynyl" refers to straight and branched chain unsaturated hydrocarbons with at least one triple bond. Alkynyl groups may have from 2 to about 20 including 2 to 12, 2 to 8, or 2 to 6 carbon atoms. Examples of a (C$_2$-C$_8$) alkynyl group include, but are not limited to, acetylene, propyne, 1-butyne, 2-butyne, 1-pentyne, 2-pentyne, 1-hexyne, 2-hexyne, 3-hexyne, 1-heptyne, 2-heptyne, 3-heptyne, 1-octyne, 2-octyne, 3-octyne and 4-octyne. An alkynyl group can be unsubstituted or optionally substituted with one or more substituents as described herein.

The term "alkoxy" or "O-alkyl" refers to a group in which an oxygen is attached to a saturated straight or branched chain alkyl group. Unless otherwise indicated, the alkoxy group contains 1 to 6 carbon atoms (e.g., methoxy, ethoxy, n-propoxy, iso-propoxy, n-butoxy, iso-butoxy, sec-butoxy, tert-butoxy, n-pentoxy, neopentyloxy, iso-pentyloxy, n-hexyloxy or iso-hexyloxy), and preferably 1 to 4 carbon atoms. Representative examples of preferred alkoxy groups include methoxy, ethoxy, n-propoxy, iso-propoxy, n-butoxy, iso-butoxy, sec-butoxy and tert-butoxy. In some embodiments, the alkoxy group may be repeated 2 or more times to form a polyether (e.g., polyoxyethyl and polyoxypropylene). In some embodiments, the alkoxy group is unsubstituted.

The term "hydroxyl" as used herein can refer to —OH or its ionized form, —O—.

The term "thiol" refers to —SH groups, while sulfides refer to —SR$^{100}$ groups, wherein R$^{100}$ is a substituted or unsubstituted alkyl, cycloalkyl, alkenyl, alkynyl, aryl aralkyl, heterocyclyl or heterocyclylalkyl group as defined herein. In some embodiments the sulfide is an alkylthio group, —S-alkyl.

The term "amine" or "amino" as used herein refers to —NR$^{101}$R$^{102}$ groups, wherein R$^{101}$ and R$^{102}$ are independently hydrogen, or a substituted or unsubstituted alkyl, alkoxy (including polyethers), alkenyl, alkynyl, cycloalkyl, aryl, aralkyl, heterocyclylalkyl or heterocyclyl group as defined herein. In some embodiments, the amine is an alkylamino, dialkylamino, or polyetheramine.

The term "amido" as used herein refers to an amino-substituted carbonyl and includes a moiety that may be represented by the general formula, —C(O)NR$^{101}$R$^{102}$ group wherein R$^{101}$ and R$^{102}$ are as defined above.

The term "carboxyl" or "carboxylate" as used herein refers to a —C(O)OH group or to its ionized form, —C(O)O—.

The term "carbonyl" as used herein refers to a —C(O)— group.

The term "epoxy" as used herein refers to a three atom ring with one oxygen and two carbon atoms. In some embodiments, the carbon atoms may be substituted with an alkyl, alkoxy (including polyethers), alkenyl, alkynyl, cycloalkyl, aryl, aralkyl, heterocyclylalkyl or heterocyclyl group as defined herein. In some embodiments, the epoxy is an alkyl epoxy, alicyclic epoxy, epoxy-polyether, or epoxy-aralkyl.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. An aryl group with one or more alkyl groups may also be referred to as alkaryl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). In some embodiments, the aryl group may be a phenyl group. Aryl groups may be substituted or unsubstituted (e.g., phenol).

Groups described herein having two or more points of attachment (i.e., divalent, trivalent, or polyvalent) within the compound of the present technology are designated by use of the suffix, "ene." For example, divalent alkyl groups are alkylene groups, divalent cycloalkyl groups are cycloalkylene groups, and so forth. Substituted groups having a single point of attachment to the compound of the present technology are not referred to using the "ene" designation. Thus, e.g., chloroethyl is not referred to herein as chloroethylene.

As used herein, "binder" refers to the film forming component of a coating. To form the films, the binder (i.e., polymer or polymeric binder) may be crosslinked, coalesced, or both (i.e., hybrid binder). Crosslinking of binders includes the addition of at least one cross-linking agent that reacts with the binder. Coalescence refers to the process where first the solvent (e.g., water) evaporates causing the polymeric binders to be drawn together and then fused into irreversibly bound networked structures, so that the coating cannot redissolve in the original carrier solvent.

As used herein, "non-hydrolyzable" refers to covalent chemical bonds that cannot be cleaved by the addition of water.

Unless stated otherwise, (meth)acrylic acid encompasses both acrylic and methacrylic acids. Similarly, (meth)acrylate encompasses both acrylate and methacrylate and (meth) acrylamide encompasses both acrylamide and methacrylamide.

Unless otherwise indicated, numeric ranges, for instance as in "from 2 to 10," are inclusive of the numbers defining the range (e.g., 2 and 10).

Unless otherwise indicated, ratios, percentages, parts, and the like are by weight.

Provided herein are siloxane modified latex polymers for use in latex paint compositions. Traditionally, tinted paints made with latex polymers show a gloss at 60 degrees from 35 to 70 gloss units, and at 20 degrees from 15 to 40 gloss units. It has now been found that through the combination of latex monomers and siloxane modification thereof, the gloss of latex-polymer-based paints can be increased to rival that of alkyd-based paints, while also exhibiting a smooth feel. Specifically, the siloxane modified latex polymers described herein will produce tinted paints having a gloss above 90 gloss units at 60 degrees, and above 70 gloss units at 20 degrees. The polymers, and paints prepared therefrom, also exhibit excellent physical and mechanical properties, as well as weatherability.

In one aspect, the present technology provides a siloxane-modified latex binder that includes a polymerization product of a monomer or a mixture of monomers for producing a latex polymer and a non-hydrolyzable siloxane. In some embodiments, the non-hydrolyzable siloxane may be represented by Formula I:

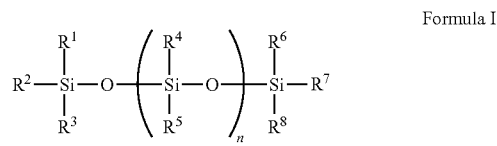

Formula I wherein $R^1$, $R^2$, $R^3$, $R^4$, $R^5$, $R^6$, $R^7$, and $R^8$ may independently be hydrogen, alkyl, —O-alkyl, —OH, —S-alkyl, —SH, amino, amido, epoxy, carboxyl, acrylate, (meth)acrylate, cycloalkyl, aryl, alkaryl, polyether, alkenyl, or alkynyl; and n may be an integer from 0 to about 300; provided that at least one of $R^1$, $R^2$, $R^3$, $R^4$, $R^5$, $R^6$, $R^7$, and $R^8$ is an alkenyl or alkynyl. In some embodiments, n may be an integer from about 50 to about 150. For example, n may be an integer from about 60 to about 120 including about 65 to about 115, about 70 to about 110, and about 80 to about 100.

In some embodiment, $R^1$, $R^2$, $R^3$, $R^4$, $R^5$, $R^6$, $R^7$, and $R^8$ may independently be hydrogen, alkyl, —O-alkyl, acrylate, (meth)acrylate, aryl, alkaryl, alkenyl, or alkynyl. In some embodiments, $R^1$, $R^2$, $R^3$, $R^4$, $R^5$, $R^6$, $R^7$, and $R^8$ may independently be $C_1$-$C_6$ alkyl or $C_1$-$C_6$ alkenyl. In some embodiments, at least one of $R^1$, $R^2$, $R^3$, $R^4$, $R^5$, $R^6$, $R^7$, and $R^8$ is alkenyl. In some embodiments, at least two of $R^1$, $R^2$, $R^3$, $R^4$, $R^5$, $R^6$, $R^7$, and $R^8$ are alkenyl. In some embodiments, $R^1$, $R^3$, $R^4$, $R^5$, $R^6$, and $R^8$ may independently be $C_1$-$C_6$ alkyl. In some embodiments, $R^1$, $R^3$, $R^4$, $R^5$, $R^6$, and $R^8$ may independently be $C_1$-$C_3$ alkyl. For example, R', $R^3$, $R^4$, $R^5$, $R^6$, and $R^8$ may each be methyl. In some embodiments, $R^2$ and $R^7$ may independently be $C_2$-$C_6$ alkenyl. In some embodiments, $R^2$ and $R^7$ may independently be $C_2$-$C_4$ alkenyl. For example, $R^2$ and $R^7$ may each be —CH=$CH_2$.

In some embodiments, the non-hydrolyzable siloxane may have a weight average molecular weight ($M_w$) of greater than about 380 g/mol. In some embodiments, the non-hydrolyzable siloxane may have a $M_w$ of about 400 g/mol to about 12,000 g/mol. In some embodiments, the non-hydrolyzable siloxane may have a $M_w$ of about 450 to about 6000. In some embodiments, the non-hydrolyzable siloxane may have a $M_w$ of about 500 to about 1500. In some embodiments, the non-hydrolyzable siloxane is a vinyl-terminated dimethylsiloxane such as SL6900 (available from Momentive Performance Materials).

In any of the above embodiments, the monomer or the mixture of monomers may include ethylenically unsaturated monomers such as (meth)acrylic acids, (meth)acrylates, styrenenated monomers, vinyl esters, and combinations of any two or more thereof. Examples of (meth)acrylates include various ($C_1$-$C_{20}$)alkyl or ($C_3$-$C_{20}$)alkenyl esters of (meth)acrylic acid; for example, methyl(meth)acrylate, ethyl (meth)acrylate, n-propyl(meth)acrylate, isopropyl(meth) acrylate, n-butyl(meth)acrylate, isobutyl(meth)acrylate, pentyl(meth)acrylate, 2-ethylhexyl(meth)acrylate, decyl (meth)acrylate, dodecyl(meth)acrylate, stearyl(meth)acrylate, α-chloroethyl(meth)acrylate, cyclohexyl(meth)acrylate, phenyl(meth)acrylate, methoxyethyl(meth)acrylate, ethoxyethyl(meth)acrylate, methoxypropyl(meth)acrylate, ethoxypropyl(meth)acrylate lauryl acrylate, methyl methacrylate, butyl methacrylate, ethyl methacrylate, isodecyl methacrylate, and lauryl methacrylate. In some embodiments, a (meth)acrylamide derivative of the (meth)acrylates may be used. Examples of styrenated monomers include styrene, alkylstyrenes (e.g., α-ethylstyrene, α-methylstyrene, vinyl toluene, 2,4-dimethylstyrene, 4-t-butylstyrene, and the like), and halostyrenes (e.g., α-bromostyrene, 2,6-dichlorostyrene, and the like). Examples of vinyl esters include vinyl carboxylate alkyl ethers (e.g., vinyl acetate, vinyl propionate, vinyl butyrates, vinyl benzoates, halo-substituted versions thereof such as vinyl chloroacetate, and the like), and vinyl versatate (Veova) monomers. Other ethylenically unsaturated monomers that can be used as co-monomers include carboxylic group-containing of monomers, hydroxyl group-containing monomers, amide group-containing monomers, and amino group-containing monomers. In some embodiments, the monomer or the mixture of monomers may include both (meth)acrylate and (meth)acrylic acid. In some embodiments, the monomer or the mixture of monomers may include two or more (meth)acrylates. In some embodiments, the monomer or the mixture of monomers may include butyl (meth)acrylate, (meth)acrylic acid, methyl (meth)acrylate, styrene, or a combination of any two or more thereof.

As such, the polymerization product of the monomer or the mixture of monomers may be a siloxane-modified (meth)acrylic acid polymer, (meth)acrylate polymer, styrene polymer, ester polymer, or a combination of any two or more thereof. The polymers may be homopolymers or copolymers. Nonlimiting illustrative copolymers of (meth)acrylic acid and/or (meth)acrylate include vinyl-(meth)acrylic acid and/or (meth)acrylate copolymers, vinyl versatate-(meth)acrylic acid and/or (meth)acrylate copolymers, styrene-(meth)acrylic acid and/or (meth)acrylate copolymers, or a combination of two or more thereof. In some embodiments, the polymerization product may include a siloxane-modified styrene-(meth)acrylic acid or (meth)acrylate copolymer. In some embodiments, the polymerization product may include a siloxane-modified styrene-(meth)acrylic acid-(meth)acrylate copolymer.

In any of the above embodiments, the polymerization product may further include a cross-linkable monomer. Illustrative cross-linkable monomers include those described in U.S. Pat. Nos. 9,040,617 and 8,980,995 (which are herein incorporated by reference). In some embodiments, the cross-linkable monomer may include a functional group such as keto, carbonyl, anhydride, epoxy, or a combination of any two or more thereof. In some embodiments, the cross-linkable monomer may include methyl vinyl ketone, ethyl vinyl ketone, butyl vinyl ketone, (meth)acrolein, crotonaldehyde, diacetone(meth)acrylamide, diacetone (meth)acrylate, mixed esters of aliphatic diols with (meth)acrylic acid or acetoacetic acid, diacetone acrylamide, diacetone methacrylamide acetoacetoxyethyl methacrylate (AAEM), maleic anhydride, itaconic anhydride, citraconic anhydride, diacetone acrylamide (DAAM), glycidyl meth(acrylate), β-methylglycidyl meth(acrylate), 3,4-epoxycyclohexylmethyl meth(acrylate), 3,4-epoxycyclohexylethyl meth(acrylate), 3,4-epoxycyclohexylpropyl meth(acrylate), allylglycidyl ether, N-methylol acrylamide, oxidatively crosslinking monomers, or a combination of any two or more thereof. For example, the cross-linkable monomer may be selected from the group consisting of acetoacetoxyethyl methacrylate (AAEM), diacetone acrylamide (DAAM), or a combination thereof. In some embodiments, the polymerization product may include about 0.5 wt % to about 5 wt % of the cross-linkable monomer based on the total siloxane-modified latex binder. In some embodiments, the polymerization product may include about 1.0 wt % to about 3 wt % of the cross-linkable monomer based on the total siloxane-modified latex binder.

In some embodiments, the present technology provides a composition including a cross-linking agent and a siloxane-modified latex binder, wherein: the siloxane-modified latex binder includes a polymerization product of a monomer or a mixture of monomers for producing a latex polymer, a non-hydrolyzable siloxane, and a cross-linkable monomer; and the cross-linking agent includes a compound of Formula III as described herein. In some embodiments, the non-hydrolyzable siloxane is represented by Formula I as defined herein. In some embodiments, the non-hydrolyzable siloxane is represented by Formula II as defined herein. In some embodiments, the monomer or the mixture of monomers are as defined herein. In some embodiments, the cross-linkable monomer is as defined herein.

In some embodiments, the polymerization product may have a weight average molecular weight ($M_w$) of greater than about 20,000 g/mol. In some embodiments, the polymerization product may have a $M_w$ of about 20,000 g/mol to about 500,000 g/mol. In some embodiments, the polymerization product may have a $M_w$ of about 40,000 g/mol to about 250,000 g/mol. In some embodiments, the polymerization product may have a $M_w$ of about 60,000 g/mol to about 100,000 g/mol. In some embodiments, the polymerization product may have a number average molecular weight ($M_n$) of greater than about 5,000 g/mol. In some embodiments, the polymerization product may have a $M_n$ of about 5,000 g/mol to about 100,000 g/mol. In some embodiments, the polymerization product may have a $M_n$ of about 10,000 g/mol to about 75,000 g/mol. In some embodiments, the polymerization product may have a $M_n$ of about 20,000 g/mol to about 50,000 g/mol. In some embodiments, the polymerization product may have a polydispersity greater than about 1. In some embodiments, the polymerization product may have a polydispersity greater than about 1.5. In some embodiments, the polymerization product may have a polydispersity greater than about 2.

The siloxane-modified latex binder may include about 0.05 wt % to about 5 wt % of the non-hydrolyzable siloxane. In some embodiments, the siloxane-modified latex binder may include about 0.075 wt % to about 3 wt % of the non-hydrolyzable siloxane. In some embodiments, the siloxane-modified latex binder may include about 0.1 wt % to about 1 wt % of the non-hydrolyzable siloxane.

The siloxane-modified latex binder may be a composition. In some embodiments, the composition may other ingredients/additives may be included in the compositions including, but not limited to, solvent(s), neutralizing agents, surfactants, emulsifiers, dispersants, polymer molecular weight control agents (e.g., CTAs), wet adhesion modifiers, oxidizers, reducing agents, or a combination of any two or more thereof. The additives may be added in the usual amounts familiar to the person skilled in the art.

In some embodiments, the composition may include a solvent such as water, an organic solvent (e.g., alcohol), or a combination thereof. In some embodiments, the composition may include water.

The composition may include one or more neutralizing agents such as ammonium, potassium, lithium, and/or sodium hydroxide. Other suitable neutralizing agents/pH adjusters include carbonates and/or amines (e.g., potassium bicarbonate, sodium carbonate, potassium carbonate, monoethanolamine, 2-amino-2-methyl-1-propanol (AMP), diethanolamine, triethanolamine, and TRIS AMINO (each available from Angus), NEUTROL TE (available from BASF), and triisopropanolamine) Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl) ethylenediamine, and 1,2-diaminopropane. Those having ordinary skill in the art will appreciate that the selection of an appropriate neutralizing agents/pH adjusters depends on the specific composition formulated, and that such a choice is within the knowledge of those of ordinary skill in the art.

The compositions may also include stabilizing agents such as cationic surfactants, anionic surfactants, or non-ionic surfactants. Examples of cationic surfactants include, but are not limited to, quaternary amines Examples of anionic surfactants include, but are not limited to, sulfonates, carboxylates, and phosphates. Illustrative sulfonates include alkylbenzene sulfonate salts (e.g., sodium dodecylbenzene sulfonate sold as Rhodacal® DS-4) and alkyl sulfonate salts (e.g., sodium $C_{14}$-$C_{16}$ sulfonate sold as Rhodacal® A-246/L) (available from Rhodia). Illustrative phosphates include alkoxy alkyl ether phosphate salts such as, ammonium polyoxyethylene tridecyl ether phosphate (sold as Rhodafac® RS-610/A25) (available from Solvay) and potassium salt phosphate coester of aliphatic alcohols (sold as Strodex™ LFK-70) (available from Ashland) In some embodiments, the phosphate surfactant may be Multz 1228. Examples of non-ionic surfactants include, but are not limited to, block copolymers containing ethylene oxide and silicone surfactants. Illustrative surfactants include ammonium nonoxynol-4 sulfate, nonylphenol (10) ethoxylate, nonylphenol ethoxylate, nonylphenol ethoxylate, octylphenol ethoxylate, octylphenol (9-10) ethoxylate, sodium dodecyl sulfonate, sodium tetradecyl sulfonate, sodium hexadecyl sulfonate, polyether phosphate esters, alcohol ethoxylate phosphate esters, and combinations of two or more thereof. Various commercially available surfactants may be used including: OP-100 (a sodium stearate), OPK-1000 (a potassium stearate), and OPK-181 (a potassium oleate) (each available from RTD Hallstar); UNICID 350 (available from Baker Petrolite); DISPONIL FES 77-IS, FES-32-IS, FES-993, and TA-430 (each available from Cognis); SOPROPHOR4D384, 3D-33, 796/P, LDS-22, and SUPRAGIL MNS/90 (available from Rhodia); E-sperse 100, 700, and 701 (anionic surfactant; available from Ethox Chemical); Triton™ (e.g., QS series such as QS-15, CF series, X series, W series such as W-30, XN-45S, H-55, GR-5M, BG-10, CG-110, and the like (available from Dow Chemical Company); DOWFAX (e.g., 2A1, 3B2, 8390, C6L, and the like (available from Dow Chemical Company); and chemicals sold under the tradenames Rhodacal® (e.g., Rhodacal® BX-78), Rhodapex® (e.g., Rhodapex® CO-436), Rhodapon®, and Rhodafac® (e.g., Rhodafac® RE-610 and RM-710).

The composition may include polymer molecular weight control agents designed to control (usually to limit) the molecular weight of a propagating polymer. While polymer molecular weight control agents may include things like radiation, they are typically molecules added to a polymerization mixture. Examples of polymer molecular weight control agents include, but are not limited to, chain transfer agents (CTAs). Commonly, CTAs operate as polymer molecular weight control agent molecules, for example, by catalytically or consumptively terminating a propagating polymer chain in a way that also initiates a newly propagating polymer chain. In this way, the amount of chain transfer agent(s) can be tailored to reduce the target polymer molecular weight in a set polymerization system, or alternately, in combination with calculation of the amount of initiator, can be calculated to target a particular average polymer molecular weight (e.g., within a given range) of a polymerization system. In some embodiments, one or more CTAs may be added to the composition during polymerization and may include alkyl mercapto-esters such as isooctyl mercaptopropionate, alkyl mercaptans, and the like, and combinations thereof. For example, the composition may include isooctyl 3-mercaptopropionate (IOMP) (available from Bruno Block and Evans Chemetics). In some embodiments, the composition may include about 0.05 wt % to about 1.0 wt % based on the total polymer content. For example, the composition may include about 0.1 wt % to about 0.5 wt % based on the total polymer content.

The composition may include wet adhesion modifiers such as alkacrylamidoalkyl ethyleneureas and alkenyloxyamidoalkyl ethyleneureas, sold under the trade names Sipomer™ WAM (II), Sipomer™ WAM (IV), WAM QM-1458, and Cylink™ C4, and Rohamere®, vinyl dicarboxylic organic acids (e.g., itaconic acid, glutaconic acid, maleic acid, angelic acid, fumaric acid, tiglic acid, and the like), monoalkyl esters of vinyl dicarboxylic organic acids (e.g., methyl maleate, ethyl fumarate, and the like), monoisopropenyl esters of saturated, vinyl dicarboxylic organic acids, monoalkoxydialkyl vinyl silanes, dialkoxyalkyl vinyl silanes, trialkoxy vinyl silanes, monoalkoxy acrylic silanes, dialkoxy acrylic silanes, trialkoxy acrylic silanes, trialkoxy methacrylic silanes, monoalkoxy epoxy silanes, dialkoxy epoxy silanes or trialkoxy epoxy silanes, diacetone acrylamides, and the like, and copolymers and combinations thereof. In some embodiments, the composition may include WAM QM-1458 (available from Dow Chemical Company).

In some embodiments, the composition may include oxidizer(s). For example, the composition may include a peroxide such as t-butyl hydroperoxide. In some embodiments, the composition may include reducing agent(s). For example, the composition may include sodium formaldehyde sulfoxylate such as Hydrosulfite® AWC. Examples of initiators and chaser solutions useful in the binder polymerization process according to the technology may include, but are not limited to, ammonium persulfate, sodium persulfate, redox systems such as sodium hydroxymethanesulfinate (sodium formaldehyde sulfoxylate; reducer) and t-butyl-hydroperoxide (oxidizer), and the like, and combinations thereof, typically in an aqueous solution. Either or both of these components can optionally contain an additional surfactant and/or a pH adjuster, if desired to stabilize the emulsion.

In another aspect, a siloxane-modified latex binder is provided that includes a polymerization product of a monomer or a mixture of monomers for producing a latex polymer including butyl (meth)acrylate, (meth)acrylic acid, methyl (meth)acrylate, styrene, or a combination of any two or more thereof; a non-hydrolyzable siloxane represented by Formula II:

Formula II

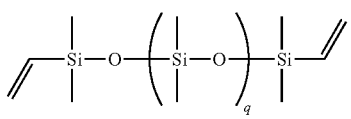

wherein q is an integer from about 60 to about 120; and a cross-linkable monomer that includes acetoacetoxyethyl methacrylate (AAEM), diacetone acrylamide (DAAM), or a combination thereof. In some embodiments, q may be an integer from about 65 to about 115 including from about 70 to about 110 and about 80 to about 100. In some embodiments, the non-hydrolyzable siloxane is a vinyl-terminated dimethylsiloxane such as SL6900 (available from Momentive Performance Materials).

In another aspect, a method of producing a siloxane-modified latex binder is provided. In some embodiment, the polymerization may be an emulsion polymerization. The method may include polymerizing a monomer or a mixture of monomers to form a latex binder; contacting a non-hydrolyzable siloxane with the latex binder to produce a siloxane-modified latex binder; and polymerizing additional amounts of the monomer or the mixture of monomers. In some embodiments, the method may include polymerizing a monomer or a mixture of monomers and a cross-linkable monomer to form a latex binder; contacting a non-hydrolyzable siloxane with the latex binder to produce a siloxane-modified latex binder; and polymerizing additional amounts of the monomer or the mixture of monomers and the cross-linkable monomer. The non-hydrolyzable siloxane, the monomer or mixture of monomers, and the cross-linkable monomer are as described herein.

In some embodiments, the polymerizing may include one or more monomer feed stages. In some embodiments, the polymerizing may include two or more monomer feed stages. In some embodiments, the polymerizing may include three or more monomer feed stages. In some embodiments, less than about 20% of the monomer or a mixture of monomers feed may be added in the first stage. For example, less than about 15% or less than about 10% of the monomer or a mixture of monomers feed may be added in the first stage. In some embodiments, the non-hydrolyzable siloxane may be added in a second stage. In some embodiments, the remainder of the monomer or a mixture of monomers feed may be added in a third stage.

In some embodiments, the polymerizing includes the addition of polymer molecular weight control agents such as chain transfer agents (CTAs) as discussed above.

In some embodiments, the polymerizing may be conducted at a temperature of about 65° C. to about 90° C. For example, the polymerizing may be conducted at a temperature of about 75° C. to about 80° C.

Compositions of the present technology may include the siloxane-modified latex binder and water. In some embodiments, the composition may be an aqueous based paint or coating. In some embodiments, the composition may include about 10 wt % to about 80 wt % of the siloxane-modified latex binder, based on the total weight of the composition. For example, the composition may include about 15 wt % to about 70 wt % or about 30 wt % to about 60 wt % of the siloxane-modified latex binder, based on the total weight of the composition. In some embodiments, the composition may have a solids content of about 10 wt % to about 85 wt %, based on the total weight of the composition. For example, the composition may have a solids content of about 25 wt % to about 80 wt %, about 35 wt % to about 75 wt %, or about 40 wt % to about 55 wt %, based on the total weight of the composition.

In any of the above embodiments, the composition may include a cross-linking agent. Illustrative cross-linking agents include those described in U.S. Pat. Nos. 9,040,617 and 8,980,995 (which are herein incorporated by reference). In some embodiments, the cross-linking agent may include a blocked cross-linking agent. As provided herein, a "blocked cross-linking agent" refers to a cross-linking agent with at least one functional group incapable of reacting with the reactive functional group on the siloxane-modified latex binder. In some embodiments, the blocked cross-linking agent may include at least one hydrazone. The blocked cross-linking agent may additionally include at least one hydrazine.

In some embodiments, compositions of the present technology may include water, a cross-linking agent, and a siloxane-modified latex binder, wherein: the siloxane-modified latex binder includes a polymerization product of a monomer or a mixture of monomers for producing a latex polymer, a non-hydrolyzable siloxane, and a cross-linkable monomer; and the cross-linking agent includes a compound of Formula III. In some embodiments, the composition may be an aqueous based paint or coating. In some embodiments, the composition may include about 10 wt % to about 80 wt % of the siloxane-modified latex binder, based on the total weight of the composition. For example, the composition may include about 15 wt % to about 70 wt % or about 30 wt % to about 60 wt % of the siloxane-modified latex binder, based on the total weight of the composition. In some embodiments, the composition may have a solids content of about 10 wt % to about 85 wt %, based on the total weight of the composition. For example, the composition may have a solids content of about 25 wt % to about 80 wt %, about 35 wt % to about 75 wt %, or about 40 wt % to about 55 wt %, based on the total weight of the composition.

The cross-linking agent may include a compound of Formula III:

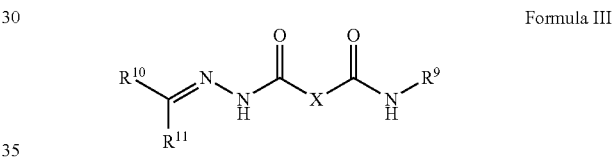

wherein X may be a bond or divalent organic group; $R^9$ may be $NH_2$ or $N=C(R^{10})(R^{11})$; and $R^{10}$ and $R^{11}$ at each occurrence may independently be hydrogen or an organic group. In some embodiments, $R^{10}$ and $R^{11}$ at each occurrence may independently be an alkyl, alkenyl, or alkynyl; or $R^{10}$ and $R^{11}$ may be joined together to form a cycloalkyl. In some embodiments, $R^{10}$ and $R^{11}$ at each occurrence may independently be a $C_1$-$C_6$ alkyl. In some embodiments, X may be an alkylene. In some embodiments, X may be a $C_1$-$C_6$ alkylene.

The composition may include about 0.1 wt % to about 10 wt % of the cross-linking agent, based on the total composition. For example, the composition may include about 0.5 wt % to about 5 wt % or about 2 wt % to about 4 wt %, based on the total weight of the composition.

The paint or coating compositions may also include a pigment. Although the present compositions may be used without pigments (as clear coats), one or more pigments may be included to provide hiding power and the desired color to the final coated material and may also be used to provide bulk to the paint or coating. All color and/or special effect-giving pigments of organic or inorganic type used in paints and coatings are suitable for use. "Colorants," as used herein, include dyes, pigments, and pre-dispersions, among others. Colorants are pigments that provide color. Colorants include red, white, blue, black, and yellow. As used herein, "pigment" refers to finely ground, insoluble material suspended in a medium, which changes the color of reflected or transmitted light through wavelength-selective absorption. Pigments typically possess high tinting strength properties and are stable in solid form at ambient temperatures. Pigments can be natural or synthetic products. While multiple pigments may be present in end-use paints or coatings, it is also possible to use only white pigment, such as titanium oxide, perhaps in combination with extender pigments. Any other desired pigments of various colors (including more white pigment) can optionally be included in the compositions. Examples include colors such as yellow, magenta, and cyan. As a black coloring agent, carbon black, and a coloring agent toned to black using the yellow/magenta/cyan coloring agents. Colorants may be used singly, in a mixture, or as a solid solution. In various embodiments, pigments may be provided in the form of raw pigments, treated pigments, pre-milled pigments, pigment powders, pigment presscakes, pigment masterbatches, recycled pigment, and solid or liquid pigment pre-dispersions. As used herein, a raw pigment is a pigment particle that has had no wet treatments applied to its surface, such as to deposit various coatings on the surface. Raw pigment and treated pigment are further discussed in PCT Publication No. WO 2005/095277 and U.S. Patent Application Publication No. 20060078485, the relevant portions of which are incorporated herein by reference. In contrast, a treated pigment may have undergone wet treatment, such as to provide metal oxide coatings on the particle surfaces. Examples of metal oxide coatings include alumina, silica, and zirconia. Recycled pigment may also be used as the starting pigment particles, where recycled pigment is pigment after wet treatment of insufficient quality to be sold as coated pigment. Illustrative colorant particles include, but are not limited to, pigments such as yellow coloring agent, compounds typified by a condensed azo compound, an isoindolynone compound, an anthraquinone compound, an azometal complex methine compound, and an allylamide compound as pigments may be used. As a magenta coloring agent, a condensed azo compound, a diketopyrrolopyrrole compound, anthraquinone, a quinacridone compound, a base dye lake compound, a naphthol compound, a benzimidazolone compound, a thioindigo compound, and a perylene compound may be used. As a cyan coloring agent, a copper phthalocyanine compound and its derivative, an anthraquinone compound, a base dye lake compound, and the like may be used.

Additional examples of pigments can include, but are not limited to, titanium dioxide, kaolin clay, calcined kaolin clay, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, quinacridone magenta, quinacridone violet, and the like, and any combination thereof. In some embodiments, the pigment is selected from the group consisting of titanium dioxide, clay, silica, diatomaceous silica, calcium carbonate, talc, zinc oxide, mica, red oxide, hansa yellow, phthalo blue, and yellow ochre. In some embodiments, the composition may include titanium dioxide such as Ti-Pure™ R-706 (available from Chemours).

In any of the above embodiments, the pigment may be a special effect pigment. Examples of special effect pigments are metal pigments, for example, from aluminum or copper, interference pigments, such as, for example, aluminum coated with titanium dioxide, coated mica, graphite effect pigments and iron oxide laminae Some special effect pigment may be inhibitor and/or extender pigments. Inhibitors, such as rust inhibitors, are pigments that have little to no corrosive action. For example, metal pigments are commonly used to protect metallic surfaces from corrosion. Illustrative inhibitor pigments include zinc, chromate, phosphate, and borate based pigments. Extender pigments are typically added to paints and coatings to reduce the cost of formulations. They may also be used to modify the viscosity, sedimentation stability, and/or film strength. Commonly, extender pigments appear white and possess a refractive index similar to commonly used binders. Illustrative extender pigments include clay, silica, and mica.

In some embodiments, the amount of pigment may be from 0 wt % to about 50 wt % based on the total weight of the composition (e.g., about 0.5 wt %, about 1 wt %, about 5 wt %, about 10 wt %, about 20 wt %, about 30 wt %, about 40 wt %, or a range between and including any two of the foregoing, such as from about 1 wt % to about 30 wt %).

The compositions may include any ingredients/additives included in the siloxane-modified binder composition, e.g., solvent(s), neutralizing agents/pH adjusters, surfactants, emulsifiers, dispersants, polymer molecular weight control agents (e.g., CTAs), wet adhesion modifiers, oxidizers, reducing agents, or a combination of any two or more thereof. The compositions may also include other ingredients/additives. For example, the compositions may include, but are not limited to, biocides, preservatives, corrosion inhibitors, rheology modifiers, coalescence aids, leveling agents, thickeners, co-solvents, defoamers, UV absorbers/protectors, or a combination of any two or more thereof. Such ingredients may provide specific properties to the composition and/or the film, such as mildew resistance, defoaming, light stability, and/or good flow and leveling during application. The additives may be added in the usual amounts familiar to the person skilled in the art.

The carrier is the solvent in which composition materials are dissolved, dispersed, and/or suspended. In the compositions of the present technology, the carrier is water, although other water-based solutions such as water-alcohol mixtures and the like may be used. The aqueous carrier generally makes up the balance of the composition, after all the other ingredients have been accounted for. In some embodiments, the composition may include a cosolvent such as an organic solvent. For example, the cosolvent may be an alcohol (e.g., methanol, ethanol, or isopropyl alcohol), glycol ether such as ethylene glycol, diethylene glycol, and/or propylene glycol, or a combination thereof. Cosolvents are sometimes present in the composition to aid in film formation, to resist freezing, and/or enhance brushing properties, such as by increasing open time. In some embodiments, the compositions may include no more than about 15 wt % cosolvent (e.g., 1-15 wt %), based on total composition. Alternatively, the compositions may include no more than about 10 wt % cosolvent or no more than about 5 wt % cosolvent (e.g., 1-10 or 1-5 wt %).

In some embodiments, the surfactant may provide dispersant properties including pigment dispersion. For example, E-Sperse® 100 (available from Ethox Chemicals) and/or TAMOL® 1124 (available from Dow Chemical Company) may be used as dispersants. Pigment dispersants are added to create a stable dispersion of the pigment. Pigment dispersants function by directly interacting with pigment particles both mechanically and electrostatically.

In some embodiments, the composition may include rheology modifiers. Rheology modifiers may be added to thicken the compositions and to increase its yield stress, thus allowing for the formation of a stable suspension of pigments in resin upon mixing. Rheology modifiers are also added to optimize the application properties of the composition. In some embodiments, the composition may include Acrysol™ such as RM-242, RM-244, RM-8W, RM-825, RM-5000, RM-2020 NPR, and RM-825 (available from Dow Chemical Company), Aquaflow™ such as NLS-200 and NHS-300 (available from Ashland), Natrasol™, UCAR Polyphobe™ (available from Dow Chemical Company), and the like.

Leveling agents are added to change the surface tension and improve wetting. Leveling agents are a subset of surfactants used to insure that a composition flows out over and completely wets the surface being coated. Reduced contact angles between the composition and the surface lead to better flow leveling, and better surface wetting allows for better adhesion of the composition and the physically coalesced and/or chemically cured film. Surfactants are also important as grinding aids for pigment grinding operations.

Defoamers are special types of surfactants that have the effect of decreasing the foaminess of an agitated coating compositions, when it is manufactured, when it is shaken or stirred, and when it is applied to a surface. Defoamers are commercially available under a number of tradenames such as, for example, BYK® 024, TEGO® Foamex, Drewplus™, Surfynol™, and the like. In some embodiments, the composition may include TEGO® Foamex 883.

The composition may include one or more coalescence aids. Coalescence aids assist the formation of a film during the drying process of the paint or coating. Examples of low-VOC coalescing agents can include, but are not limited to, fatty acid alkylene glycol monoesters, aromatic alkoxylates (e.g., cresol propoxylates such as those compounds sold under the tradename PLURACOAT™, including PLURACOAT™ CA120, PLURACOAT™ CA110, and PLURACOAT™ CA100), those compounds sold under the tradename EDENOL™ from Cognis (e.g., EDENOL™ EFC 100), those compounds sold under the tradename OPTIFILM™ from Eastman Chemical (e.g., OPTIFILM™ Enhancer 400), and the like, and combinations thereof. While less preferred, the composition can contain traditional (VOC) coalescence aids, which can include, but are not limited to, 2-ethylhexyl ether of ethylene glycol (e.g., commercially available from Eastman Chemical as Eastman™ EEH solvent), alkyl esters of aromatic carboxylic acids (e.g., 2-ethylhexyl benzoate and/or those compounds sold under the tradename Velate™ 368 from Velsicol Chemical Corp.), methyl carbitol, propylene glycol, ethylene glycol, optionally-alkyl-substituted alkanediol organic carboxylic acid monoesters (e.g., 2,2,4-trimethyl-1,3-pentanediol monoisobutyrate and those compounds sold under the tradename Texanol™ (available from Eastman Chemical)), phosphate salts such as potassium tetrapyrophosphate, plasticizers such as dibutyl phthalate, and the like, and combinations thereof. For example, the composition may include Loxanol® CA 5120 (previously named Pluracoat CA 120; available from BASF) and/or Texanol™ ester alcohol.

In some embodiments, the composition may include a hydrocarbon emulsion. For example, the composition may include a paraffin wax emulsion such as Aquacer 539 (available from BYK-Chemie GmbH). In some embodiments, the composition may include a hydrocarbon fluid such as isoparaffin fluid. For example, the composition may include a synthetic isoparaffin such as Isopar™ L (available from Exxon Mobil).

Thickeners are used to obtain the desired degree of viscosity needed for the proper formulation and application of the composition. One general type of thickener is referred to in the art by the term "associative." Associative thickeners are so called because the mechanism by which they thicken is believed to involve hydrophobic associations between the hydrophobic moieties in the thickener molecules and/or between the hydrophobic moieties in the thickener molecules and other hydrophobic surfaces. One type of commonly used associative thickener has a polymeric backbone constructed from one or more blocks of polymerized oxyalkylene units, typically polyethylene oxide or polypropylene oxide, with hydrophobic groups attached to or within the backbone. Another type of commonly used associative thickener utilizes a cellulosic backbone with hydrophobic groups attached to the backbone. Both of these types of associative thickeners can be characterized as polyether thickeners as they both have backbones comprising ether linkages. Known polyether associative thickeners are nonionic thickeners, and their thickening efficiencies in aqueous systems are substantially independent of pH. Other thickeners may also be included in the compositions such as those described in U.S. Pat. No. 7,741,402, which is herein incorporated by reference.

Corrosion inhibitors and flash rust inhibitors suppress the migration of colored corrosion products from the surface of coated metal objects (e.g., exposed nail heads in drywall) to the surface of the coating. Also, rust inhibitors may be added to prevent corrosion of iron alloy cans during coating storage.

Biocides and mildewcides are added to control microbial growth in the compositions and/or in the film. Microbes can colonize leading to filamentous growths, bad odors and the selective consumption of functional coating ingredients. Some biocides are added solely to control microbes during storage of the composition (so called in-can biocides) while other biocides are added to impart biostability to the coalesced/cured film (so called dry film biocides). Some biocides can prevent both in-can and dry film biological growth. Examples of biocides or preservatives may include, but are not limited to, hydroxy-functional aza-dioxabicyclo compounds such as those commercially available from ISP under the tradename Nuosept™ 95, those compounds sold under the tradename SKANE™ isothiazolones such as those sold under the tradename Kathon™, Polyphase™ additives from Troy Corp. and the like, and combinations thereof. In some embodiments, the composition may include the microbicide KATHON™ LX 1.5% (available from Dow Chemical Company).

In some embodiments, the compositions may include fillers. Nonlimiting examples of fillers are silicon dioxide, barium sulfate, talcum, calcium carbonate, aluminum silicate, magnesium silicate, and combinations of two or more thereof.

In some embodiments, the compositions may include freeze-thaw additive(s). In some embodiments, the present compositions may include humectant(s).

The composition may include light stabilizers and UV absorbers such as those sold under the tradename Tinuvin® (available from Dow Chemical Company).

In another embodiment, a physically coalesced and/or chemically cured paint or coating is provided. In some embodiments, the composition may be cured and/or physically coalesced at temperatures of at least about 1° C. In some embodiments, the temperatures may be at least about 5° C. In some embodiments, the temperatures may be at least about 10° C. In some embodiments, the temperatures may be at least about 15° C. For example, the composition may be cured and/or physically coalesced at about room temperature.

In some embodiments, the paint or coating gloss measured at 60° is at least about 85 gloss units (assessed by the gloss testing method provided herein). In some embodiments, the paint or coating gloss measured at 60° is at least about 87 gloss units. In some embodiments, the paint or coating gloss measured at 60° is at least about 90 gloss units. In some embodiments, the paint or coating gloss measured at 20° is at least about 65 (assessed by the gloss testing method provided herein). In some embodiments, the paint or coating gloss measured at 20° is at least about 68 gloss units. In some embodiments, the paint or coating gloss measured at 20° is at least about 70 gloss units. In some embodiments, the paint or coating exhibits a gloss retention of at least about 70% after 2000 hours (assessed by the weather-o-meter testing method provided herein). In some embodiments, the paint or coating exhibits a gloss retention of at least about 80% after 2000 hours. In some embodiments, the paint or coating exhibits a smooth, tactile surface (assessed by the smoothness testing method provided herein).

The compositions described herein may be manufactured by conventional paint and coating manufacturing techniques, which are well known to those skilled in the art. Typically, the compositions are manufactured by a two-step process. First, a dispersion phase, commonly referred to as the grind phase, is prepared by mixing the dry pigments with other grind phase components, including most other solid powder formulation materials, under high shear agitation to provide a high viscosity and high solids mixture. This part of the process is designed to effectively wet and disagglomerate the dry pigments to a finely dispersed state. In some embodiments, the grind phase (i.e., pigment dispersion composition) is formed by: combining water, an optional organic solvent, a dispersant, a pH adjuster, a surfactant, a defoamer, a pigment/colorant, and a biocide and/or a preservative; stirring and optionally grinding for a period of time to sufficiently mix the ingredients; and, while continuing to stir and/or grind, adding more water.

The second step of the paint/coating manufacturing process is commonly referred to as the letdown or thindown phase, because the viscous grind is diluted with the remaining formulation components, which are generally less viscous than the grind mix. Typically, the binder of the present technology, any predispersed pigments, and any other paint/coating ingredients that only require mixing and perhaps moderate shear, are incorporated during the letdown phase. The letdown phase may be done either by sequentially adding the letdown components into a vessel containing the grind mix, or by adding the grind mix into a vessel containing a premix of the binder and other letdown components, followed by sequential addition of the final letdown components. In either case, constant agitation is needed, although application of high shear is not required. In some embodiments, the binder of the present technology may be added to the grind phase followed by a pH adjuster, if desired, and an optional performance additive composition, such as without limitation, a surfactant, and a defoamer. A coalescence aid may optionally be added. Then, one or more rheology modifiers may be added, optionally including water, and a pH adjuster, forming the paint composition. Additional pigment/colorants may also be added, if desired for shading. For a clear coating without pigments, the grinding step may be excluded.

In another aspect the present technology contemplates a process for preparing a coating layer, which includes:
1) applying a coating layer from a composition provided herein, and
2) curing and/or drying/coalescing the coating layer. Optionally, the applied coating layer may be flashed off to remove water and organic solvent, if present.

Abbreviations

IOMP—isooctyl-3-mercaptopropionate
TBH—t-butyl hydroperoxide
MAA—methacrylic acid
MMA—methyl methacrylate
Sty—styrene
BA—butyl acrylate
DAAM—diacetone acrylamide
AAEM—acetoacetoxyethyl methacrylate
ADH—adipic dihydrazide blocked with acetone
VOC—volatile organic compound(s)

EXAMPLES

The examples herein are provided to illustrate advantages of the present technology and to further assist a person of ordinary skill in the art with preparing or using the compositions of the present technology. The examples herein are also presented in order to more fully illustrate the preferred aspects of the present technology. The examples should in no way be construed as limiting the scope of the present technology, as defined by the appended claims. The examples can include or incorporate any of the variations, aspects or aspects of the present technology described above. The variations, aspects or aspects described above may also further each include or incorporate the variations of any or all other variations, aspects or aspects of the present technology.

Testing Methods

Gloss: To determine the gloss of the paint compositions, an air dry gloss 0.003 drawdown (DD) test was performed, which included air drying a 3 mil DD paint film and then determining its gloss at a preselected reflecting angle of 600 from the vertical using a standardized meter in accordance with ASTM D 523 ("Standard Test Method for Specular Gloss"). Gloss ratings by this test method are thus obtained by comparing the reflectance from the specimen to that from a polished glass standard at a reflecting angle of 20° and 60°. Gloss pertains to the shininess of the dried paint's surface. Traditional semi-gloss paints have a gloss at 20° of 15-40 gloss units and a gloss at 60° of 35-70 gloss units.

Blocking 7D: Block resistance, or the propensity of a coating to adhere to itself instead of to its substrate, was measured according to a modified version of ASTM D4946-89, which is referred to as the Block Resistance 7 Day 120° F. test. According to this test, on a sealed white Leneta™ WK card, a 3 mil thick coating of the paint composition was prepared. After 7 days of drying at room temperature, the cured coating was cut into four one inch squares. Two of the squares were oriented face to face (i.e., coated sides touching) and are placed under a 100-gram weight in a 120° F. oven for about 24 hours. The other two of the squares were oriented face to face and placed under a 100-gram weight at room temperature for about 24 hours. Both sets of face to face squares were then allowed to equilibrate to ambient temperature for about ½ hour. Each set of squares was then pulled apart using a slow and steady force, forming a T pattern. Block resistance was rated based on the percentage of area of the paint on one surface that was transferred to the other surface. The transfer of 0% indicates a perfect blocking resistance, which is assigned a score of 5 on a 5-point scale, while 100% transfer indicate that paints on both sides are completely stuck together, which is assigned a score of 1 on the 5-point scale.

Scrub Resistance: Scrub resistance was measured according to a modified version of ASTM D2486 Method B, and this test is referred to herein as the Scrub Resistance 7 Day Dry test. A scrub panel was created with three 9"-wide draw down coatings of the composition of about 7 mils thickness prepared side by side (at least one of the samples should be a control sample) and allowed to cure horizontally for 7 days at room temperature (e.g., from about 20-25° C.). Black scrub panels were preferably used for coating compositions that are white, pastel, and medium colors. In addition, an extra scrub panel was used as a conditioning panel. On a Gardner™ Abrasion Tester, the night before testing, a medium bristle brush was soaked in deionized water overnight. Just before the testing, the excess water was shaken from the brush, and the brush was placed in the brush holder. Before testing the scrub panels, the conditioning panel was secured in the Gardner™ Abrasion Tester. With a wooden tongue depressor, about 10 grams of abrasive scrub medium was applied to the brush, and about 5 mL of deionized water was syringed evenly across the panel in the area to be scrubbed. The conditioning panel was scrubbed for about 400 cycles. Thereafter, the conditioning panel was removed and discarded, the brush was washed with water, and each scrub panel was secured in the Gardner™ Abrasion Tester. Like with the conditioning panel, the abrasive scrub medium was applied to the brush, and the water was applied to the panel. The scrub panel was then scrubbed for a maximum of about 2000 cycles (typically about 1 hour). About every 100 cycles, excess scrub medium was moved from outside the scrub area to inside the scrub area. About every 400 cycles, another 10 grams of scrub medium was added to the brush, and another 5 mL of deionized water was syringed onto the scrub area. The number of cycles it took to remove one continuous line of each coating was noted. This process was repeated for each scrub panel.

Stain: Stain removal testing was conducted in accordance with ASTM D4828 in order to evaluate the ease of stain removal caused by a test stain material. The compositions were drawn down on a black vinyl chart and allowed to dry for 7 days in a constant temperature and humidity room at 77° F. and 30% relative humidity. Oil and TTP and were applied in separate tests to the film and allowed to stand for 2 hours. Excess stain was gently wiped using laboratory tissue, and then placed upon a Washability tester fitted with a sponge. The sponge was saturated with a 1% solution of a cleaning solution containing ethoxylated alcohol and lauryl polyglucose in water (S. C. Johnson & Son, Inc.), and the soiled film subjected to 250 repeated scrub cycles. Results are assessed based on the number of scrub cycles required to remove the stain, so the fewer number of cycles needed to remove the stain the better the ease of stain removal exhibited by the paint. A rating of "excellent" means the stain was removed in 10-25 cycles. A rating of "moderate" means the stain was not completely removed after 250 cycles and the "color difference" (brown from the stain) is visible, but not dark.

Weather-o-meter: Weather-o-meter testing was conducted to assess UV aging of the compositions according to a modified version of ASTM G155, which uses a Xenon arc as a UV source. Testing ASTM G155 allows for reproduction of the weathering effects that occur when materials are exposed to sunlight (either direct or through window glass) and moisture. ASTM G155 was modified such that the compositions after drying were exposed to constant light and wetted with deionized water for 30 minutes every 1.5 hours. Gloss, as described above, was measured before and after weather-o-meter exposure.

Example 1: Binder with DAAM Crosslinkable Monomer

The components for forming a crosslinkable binder are provided in Table 1. To produce the binder, the reactor seeding was added into a nitrogen purged reactor followed by a temperature increase to 75-80° C. Next, 50 g of the premixed monomer emulsion was added to the reactor followed by initiator solution I. The mixture was then allowed to react for 15 minutes. The remaining monomer emulsion and initiator solution II were then simultaneously added to the reactor over a period of 3.5 hours. The monomer emulsion feeding lines were then rinsed and the reactor was held at 80° C. for 1 hour. The reactor was cooled to 60° C. followed by the simultaneous addition of the oxidizing agent and reducing agent solutions over a period of 30 minutes. The reactor was cooled to room temperature and the ammonium hydroxide solution was added to arrive at a binder with a Flory-Fox glass transition temperature of 11° C. and a solids content of 48.9%.

TABLE 1

| Component | Amount (g) |
|---|---|
| Reactor Seeding | |
| water | 810 |
| sulfonate surfactant | 2 |
| Monomer Emulsion | |
| water | 230 |
| DAAM | 35 |
| sulfonate surfactant | 35 |
| phosphate surfactant | 25 |
| dispersant | 8 |
| wet adhesion modifier | 25 |
| MAA | 61 |
| MMA | 28 |
| Sty | 480 |
| BA | 562 |
| IOMP (Chain transfer) | 6 |
| Initiator Solution I | |
| water | 40 |
| Ammonium persulfate | 2.5 |
| Initiator Solution II | |
| Ammonium persulfate | 2.5 |
| water | 40 |
| Rinse | |
| water | 20 |
| Oxidizing Agent Solution | |
| TBH | 2.1 |
| water | 20 |
| Reducing Agent Solution | |
| formaldehyde sulfoxylate salt | 1.5 |
| water | 20 |
| Ammonium Hydroxide Solution | |
| $NH_4OH$ | 13 |
| water | 10 |
| Total | 2478.6 |

Examples 2 and 3: Binder with DAAM Crosslinkable Monomer and Varying Amounts of Chain Transfer Agent Example 2 was produced following the same methods and using the same components as Example 1, but the amount of IOMP was increased to 8 g. Example 3 was produced following the same methods and using the same components as Example 1, but the amount of IOMP was decreased to 4 g.

Examples 4 and 5: Binder with AAEM Crosslinkable Monomer

Example 4 was produced following the same methods and using the same components as Example 1, but the DAAM monomer was replaced with AAEM (62 g). Example 5 was produced following the same methods and using the same components as Example 1, but with a reduced amount of DAAM monomer (30 g) and the addition of AAEM (32 g).

Examples 6-10: Paint Compositions with Example 1-5 Binders

Using the binder of Example 1, a paint composition was produced. The components for the composition are provided in Table 2. While agitated at high speeds, the grind components were mixed for 10 minutes followed by additional water. The agitation was slowed to mixing speed and the phase 1 letdown components were added and mixed for 20 minutes. The phase 2 letdown components were then added followed by additional mixing.

TABLE 2

| Component | Amount (lbs) |
|---|---|
| Grind | |
| water | 55 |
| microbicide 1.5% | 1 |
| Ammonia 26% | 1 |
| dispersant | 12 |
| Titanium dioxide | 220 |
| Defoamer | 2 |
| rheology modifier | 3 |
| water | 125 |
| Letdown Phase 1 | |
| Defoamer | 4 |
| Phosphate surfactant | 6 |
| Ammonia 26% | 0.5 |
| Isopar ™ L | 1 |
| rheology modifier | 20 |
| rheology modifier | 6 |
| Phase 2 | |
| Example 1 binder | 500 |
| Defoamer | 4 |
| paraffin wax emulsion | 15 |
| water | 17 |
| coalescence aid | 8 |
| coalescence aid | 6.5 |
| Adipic acid dihydrazide acetone capped (40%) | 16 |

Using the binders of Examples 2-5, paint compositions (Examples 7-10) were produced. All of the paint compositions (Examples 6-10) passed the low temperature coalescence at 40° F. with a 4-24 mil draw down bar. Various tests were conducted, the results are provided in Table 3 along with a comparison to a high gloss, standard commercial paint using an acrylic/styrene binder.

TABLE 3

| Paint Composition | Binder | VOC g/L | Gloss 20/60 | Blocking 7 D | Scrub resistance | Stain (Oil/TTP) | |
|---|---|---|---|---|---|---|---|
| Example 6 | Example 1 | 31 | 71.6/91.2 | 4 | 996-1304 | Excl | Excl |
| Example 7 | Example 2 | 31 | 75.7/91.4 | 4 | 491-651 | Excl | Excl |
| Example 8 | Example 3 | 31 | 67.4/88.7 | 60% | 699-1082 | Excl | Excl |
| Example 9 | Example 4 | 31 | 64.2/88.4 | 5 | 905-1292 | Excl | Excl |
| Example 10 | Example 5 | 31 | 72.5/91.1 | 3 | 878-1341 | Excl | Mod |
| Standard commercial paint | | 233 | 42/69 | 4 | 308-412 | Excl | Excl |

Excl = excellent
Mod = moderate

Example 11: Siloxane-Modified Binder (Siloxane at 50% Shell)

The components for a siloxane-modified binder are provided in Table 4. To produce the binder, the reactor seeding was added into a nitrogen purged reactor followed by a temperature increase to 75-80° C. Next, 50 g of the premixed monomer emulsion was added to the reactor followed by initiator solution I. The mixture was allowed to react for 15 minutes. The remaining monomer emulsion and initiator solution II were then simultaneously added to the reactor over a period of 3.5 hours. When 50% of the remaining monomer emulsion had been fed to the reactor, the siloxane was added to the monomer emulsion and mixed, followed by continuing the monomer emulsion and initiator solution II reactor feeds. The monomer emulsion feeding lines were then rinsed and the reactor was held at 80° C. for 1 hour. The reactor was cooled to 60° C. followed by the simultaneous addition of the oxidizing agent and reducing agent solutions over a period of 30 minutes. The reactor was cooled to room temperature and the ammonium hydroxide solution was added to arrive at a siloxane-modified binder with siloxane at 50% shell, styrene content of 33%, and a Flory-Fox glass transition temperature of 3.8° C.

Example 12: Siloxane-Modified Binder (Siloxane at 25% Shell)

Example 12 was produced following the same methods and using the same components as Example 11, but the amount monomer amounts were changed (Table 4) and the siloxane was added to the monomer emulsion and mixed after 75% of the monomer emulsion had been fed to the reactor to arrive at a siloxane-modified binder with siloxane at 25% shell, styrene content of less than 30%, and a Flory-Fox glass transition temperature of 4.6° C.

Example 13: Siloxane-Modified Binder (Siloxane at 25% Shell and Phosphate Surfactant)

Example 13 was produced following the same methods and using the same components as Example 12, but a phosphate surfactant was added to the monomer emulsion at the same time as the siloxane (Table 4) to arrive at a siloxane-modified binder with siloxane at 25% shell, styrene content of less than 30%, and a Flory-Fox glass transition temperature of 4.51° C.

TABLE 4

| Component | Example 11 Amount (g) | Example 12 Amount (g) | Example 13 Amount (g) |
|---|---|---|---|
| Reactor Seeding | | | |
| water | 800 | 805 | 820 |
| sulfonate surfactant | 2 | 1.6 | 1.6 |
| NaHCO$_3$ | 0.5 | 0.5 | 0.5 |
| Monomer Emulsion | | | |
| water | 220 | 220 | 220 |
| DAAM | 35 | 35 | 36 |
| sulfonate surfactant | 23 | 23 | 23 |
| phosphate surfactant | 16 | 16 | 16 |
| dispersant | 10 | 10 | 10 |
| wet adhesion modifier | 24 | 23 | 23 |
| MAA | 48 | 54 | 54 |
| MMA | 60 | 98 | 98 |
| Sty | 398 | 360 | 360 |
| BA | 612 | 612 | 612 |
| IOMP (Chain transfer) | 6 | 5 | 5 |
| vinyl-terminated dimethylsiloxane | 3.6 | 3.5 | 3.5 |
| phosphate surfactant | 0 | 0 | 1.8 |
| Initiator Solution I | | | |
| water | 40 | 40 | 40 |
| Ammonium persulfate | 2.5 | 2.5 | 2.5 |
| Initiator Solution II | | | |
| Ammonium persulfate | 2.5 | 2.5 | 2.5 |
| water | 40 | 40 | 40 |
| Rinse | | | |
| water | 20 | 20 | 20 |
| Oxidizing Agent Solution | | | |
| TBH | 2.1 | 2.1 | 2.1 |
| water | 20 | 20 | 20 |
| Reducing Agent Solution | | | |
| formaldehyde sulfoxylate salt | 1.5 | 1.5 | 1.5 |
| water | 20 | 20 | 20 |
| Ammonium Hydroxide Solution | | | |
| NH$_4$OH | 13 | 13 | 13 |
| water | 10 | 10 | 10 |
| Total | 2478.6 | 2478.6 | 2478.6 |

Example 14: Siloxane-Modified Binder Produced by Multi-Stage Monomer Feed Process (Siloxane at 25% Shell and Phosphate Surfactant)

Example 14 was produced following similar methods and components (Table 5) as Example 12, but the monomer emulsion was added in three steps (i.e., a multi-stage monomer feed process). Specifically, after 50 g of the premixed monomer emulsion and initiator solution I were added to the reactor, monomer emulsion 1 and initiator solution II were simultaneously added until 800 g of monomer emulsion 1 was added. Monomer emulsion 2 was then added to the remaining portion of monomer emulsion 1 and mixed for 2 minutes. The monomer emulsion and initiator solution II reactor feeds were then restarted. The total time for the monomer emulsion and initiator solution II reactor feeds was 3.5 hours. When 75% of the monomer emulsion had been fed to the reactor, the siloxane and phosphate surfactant were added to the monomer emulsion and mixed followed by restarting the monomer emulsion and initiator solution II reactor feeds. The monomer emulsion feeding lines were then rinsed and the reactor was held at 80° C. for 1 hour. The reactor was then cooled to 60° C. followed by the simultaneous addition of the oxidizing agent and reducing agent solutions over a period of 30 minutes. The reactor was cooled to room temperature and the ammonium hydroxide solution was added to arrive at a siloxane-modified binder with siloxane at 75% shell and a Flory-Fox glass transition temperature of 2.4° C.

TABLE 5

| Component | Example 14 Amount (g) |
|---|---|
| Reactor Seeding | |
| water | 805 |
| sulfonate surfactant | 1.5 |
| NaHCO$_3$ | 0.5 |
| Monomer Emulsion 1 | |
| water | 230 |
| DAAM | 32 |
| sulfonate surfactant | 23 |
| phosphate surfactant | 18 |
| dispersant | 10 |
| wet adhesion modifier | 24 |
| MAA | 61 |
| MMA | 80 |
| Sty | 360 |
| BA | 500 |
| IOMP (Chain transfer) | 2 |
| Monomer Emulsion 2 | |
| water | 30 |
| MAA | 7 |
| BA | 130 |
| IOMP (Chain transfer) | 2 |
| DAAM | 7 |
| vinyl-terminated dimethylsiloxane | 3.5 |
| IOMP (Chain transfer) | 1 |
| phosphate surfactant | 1.8 |
| Initiator Solution I | |
| water | 40 |
| Ammonium persulfate | 2.5 |
| Initiator Solution II | |
| Ammonium persulfate | 2.5 |
| water | 40 |
| Rinse | |
| water | 20 |
| Oxidizing Agent Solution | |
| TBH | 2.1 |
| water | 20 |
| Reducing Agent Solution | |
| formaldehyde sulfoxylate salt | 1.5 |
| water | 20 |
| Ammonium Hydroxide Solution | |
| NH$_4$OH | 13 |
| water | 10 |
| Total | 2603.3 |

Examples 15-18: Paint Compositions with Example 11-14 Binders

Using the binder of Example 11, a clear coating was produced. The components for the composition are provided in Table 6. While agitated at high speeds, the grind components were mixed for 10 minutes. The agitation was slowed to mixing speed and the phase 1 letdown components were added and mixed for 20 minutes. The phase 2 letdown components were then added followed by additional mixing.

Rheology modifier was added followed by 20 minutes of mixing. Finally, additional water was added followed by more mixing. Similarly, using the binders of Examples 12-14, clear coatings (Examples 16-18) were produced.

TABLE 6

| Component | Example 15 Amount (lbs) | Example 16 Amount (lbs) | Example 17 Amount (lbs) | Example 18 Amount (lbs) |
|---|---|---|---|---|
| Grind | | | | |
| water | 130 | 130 | 130 | 130 |
| microbicide 1.5% | 1 | 1 | 1 | 1 |
| Ammonia 26% | 1 | 1 | 1 | 1 |
| dispersant | 12 | 12 | 12 | 12 |
| Letdown Phase 1 | | | | |
| Ammonia 26% | 0.494 | 0.494 | 0.494 | 0.494 |
| Anionic surfactant - sulfonate salt | 4 | 4 | 4 | 4 |
| Sodium benzoate | 2 | 2 | 2 | 2 |
| Phase 2 | | | | |
| binder | Example 11 580 | Example 12 580 | Example 13 580 | Example 14 580 |
| Adipic acid dihydrazide acetone capped (40%) | 16 | 16 | 16 | 16 |
| coalescence aid | 11 | 15 | 8 | 15 |
| Glycol ether | 0 | 0 | 7 | 0 |
| paraffin wax emulsion | 30 | 30 | 30 | 30 |
| light stabilizer/UV absorbers | 6.4 | 6.4 | 6.4 | 6.4 |
| light stabilizer/UV absorbers | 3.8 | 3.8 | 3.8 | 3.8 |
| Rheology modifier | 14.9 | 14.9 | 14.9 | 14.9 |
| Rheology modifier | 5 | 0 | 2 | 8 |
| water | 44.038 | 42.619 | 37.053 | 44.5 |

The paints of Examples 15-18 were tinted with Tudor Brown (i.e., tinted paint). All paints passed the low temperature coalescence at 40° F. with a 4-24 mil draw down bar. Various tests were conducted, the results are provided in Table 3 along with a comparison to a high gloss, standard commercial paint using an acrylic/styrene binder (N3091B). The gloss retention of clear coats were measured at 60 degrees over an extended periods of time in Weather-o-meter testing (FIG. 1). The paints of Examples 15-18 retained much more of their gloss compared to the high gloss, standard paint composition.

TABLE 7

| Paint Composition | Binder Composition | VOC g/L | Clear Coat Gloss 20/60 | Tinted Paint Gloss | Blocking 7D |
|---|---|---|---|---|---|
| Example 15 | Example 11 | 36 | 72/87 | 65/85 | 4 |
| Example 16 | Example 12 | 48 | 65/85 | 66/85 | 4 |
| Example 17 | Example 13 | 48 | 70/86 | 66/84 | 4 |
| Example 18 | Example 14 | 48 | 70/87 | 64/84 | 4 |
| Standard commercial paint (N3091B) | | 115 | — | 40/75 | 5 |

Examples 19-22: Pastel Paint Compositions with Example 11-14 Binders

Following the process of Examples 15-18, pastel paint compositions were produced using the binders of Examples 11-14. The components for the composition are provided in Table 8.

TABLE 8

| Component | Example 19 Amount (lbs) | Example 20 Amount (lbs) | Example 21 Amount (lbs) | Example 22 Amount (lbs) |
|---|---|---|---|---|
| Grind | | | | |
| water | 80 | 80 | 80 | 80 |
| microbicide 1.5% | 1 | 1 | 1 | 1 |
| Ammonia 26% | 1 | 1 | 1 | 1 |
| dispersant | 12 | 12 | 12 | 12 |
| Sodium benzoate | 2.5 | 2.5 | 2.5 | 2.5 |
| Titanium dioxide | 168 | 168 | 168 | 168 |
| Defoamer | 0.4 | 0.4 | 0.4 | 0.4 |
| Rheology modifier | 4.4 | 4.4 | 4.4 | 4.4 |
| Rheology modifier | 2 | 2 | 2 | 2 |
| Letdown Phase 1 | | | | |
| Ammonia 26% | 0.5 | 0.5 | 0.5 | 0.5 |
| water | 64 | 64 | 64 | 64 |
| phosphate surfactant | 2 | 2 | 2 | 2 |
| Phase 2 | | | | |
| binder | Example 11 510 | Example 12 510 | Example 13 510 | Example 14 510 |
| sulfonate surfactant | 2 | 2 | 2 | 2 |
| Adipic acid dihydrazide acetone capped (40%) | 16 | 16 | 16 | 16 |
| coalescence aid | 11 | 10 | 10 | 7 |
| Glycol ether | 0 | 0 | 0 | 11 |
| paraffin wax emulsion | 25 | 25 | 25 | 25 |
| light stabilizer/UV absorbers | 6.4 | 6.4 | 6.4 | 6.4 |
| light stabilizer/UV absorbers | 3.8 | 3.8 | 3.8 | 3.8 |
| Rheology modifier | 11.4 | 11.4 | 11.4 | 11.4 |
| Rheology modifier | 5 | 0 | 0.5 | 9 |
| water | 56.621 | 62.382 | 61.912 | 45.559 |

Figure 2:
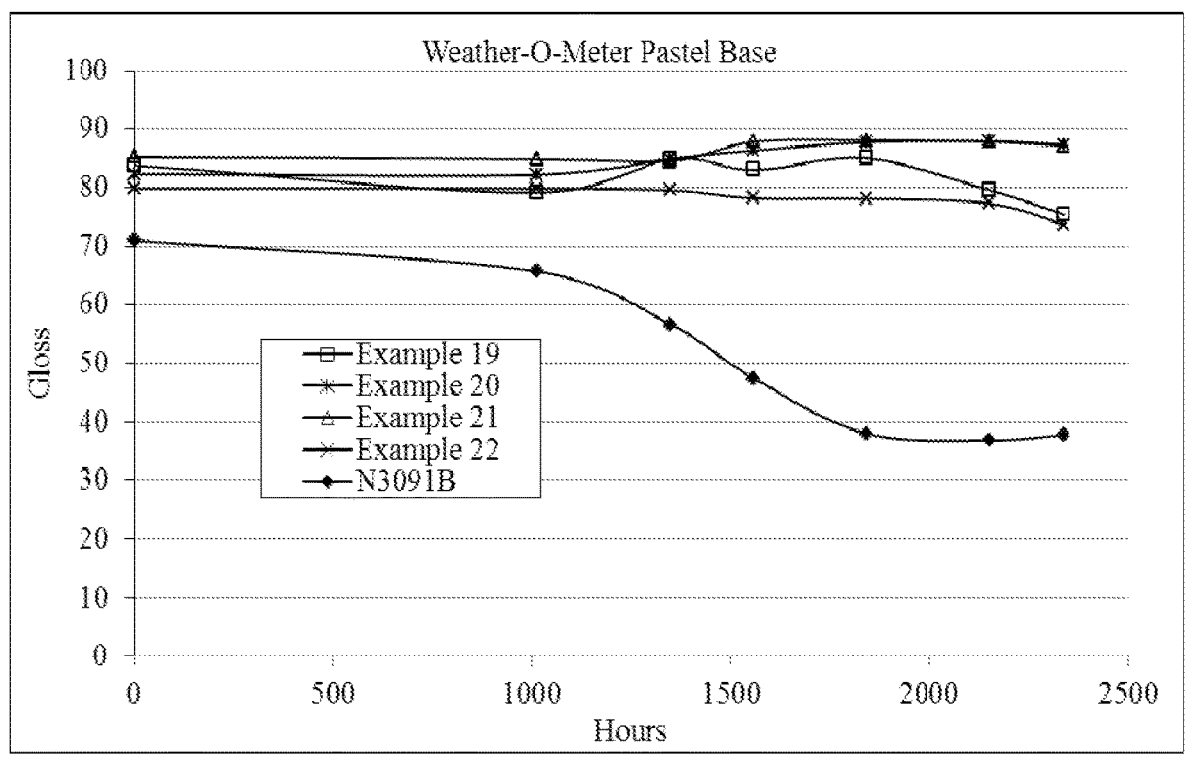
FIG. 2 provides gloss retention at 60 degrees, as measured after Weather-o-meter exposure, of illustrative tinted paints of the present technology compared to a high gloss, standard commercial paint using an acrylic/styrene binder.

The paints of Examples 19-22 were tinted with Sail Cloth. All paints passed the low temperature coalescence at 40° F. with a 4-24 mil draw down bar. The results of paint composition examples 19-22 are provided in Table 9 along with a comparison to a high gloss, standard commercial paint using an acrylic/styrene binder (N3091B). The gloss retention of tinted paints at 60 degrees were measured over an extended period of time in Weather-o-meter testing (FIG. 2). The paints of Examples 19-22 retained much more of their gloss compared to the high gloss, standard paint composition.

TABLE 9

| Paint Composition | Binder Composition | VOC g/L | White Paint Gloss 20/60 | Tinted Paint Gloss | Blocking 7D |
|---|---|---|---|---|---|
| Example 19 | Example 11 | 35 | 72/90 | 68/88 | 3 |
| Example 20 | Example 12 | 32 | 74/89 | 69/88 | 4 |
| Example 21 | Example 13 | 31 | 68/87 | 65/86 | 4 |

TABLE 9-continued

| Paint Composition | Binder Composition | VOC g/L | White Paint Gloss 20/60 | Tinted Paint Gloss | Blocking 7D |
|---|---|---|---|---|---|
| Example 22 | Example 14 | 55 | 68/87 | 65/86 | 5 |
| Standard commercial paint (N3091B) | | 112 | 61/83 | 55/83 | 5 |

Illustrative Embodiments

Reference is made in the following to a number of illustrative embodiments of the subject matter described herein. The following embodiments describe illustrative embodiments that may include various features, characteristics, and advantages of the subject matter as presently described. Accordingly, the following embodiments should not be considered as being comprehensive of all of the possible embodiments or otherwise limit the scope of the compositions described herein.

In some embodiments, the composition may include a cross-linking agent and a siloxane-modified latex binder, wherein: the siloxane-modified latex binder may include a polymerization product of a monomer or a mixture of monomers for producing a latex polymer, a non-hydrolyzable siloxane, and a cross-linkable monomer; and the cross-linking agent may include a compound of Formula III:

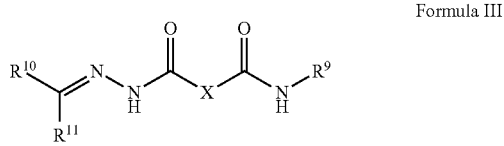

Formula III wherein: X may be a bond or divalent organic group; $R^9$ may be $NH_2$ or $N=C(R^{10})(R^{11})$; and $R^{10}$ and $R^{11}$ at each occurrence may independently be hydrogen or an organic group.

In some embodiments, the present technology provides a siloxane-modified latex binder that may include a polymerization product of a monomer or a mixture of monomers for producing a latex polymer and a non-hydrolyzable siloxane.

In the siloxane-modified latex binder of paragraph [0102] and/or paragraph [0103], the non-hydrolyzable siloxane may be represented by Formula I:

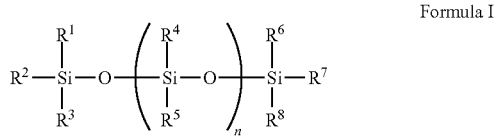

Formula I wherein: $R^1$, $R^2$, $R^3$, $R^4$, $R^5$, $R^6$, $R^7$, and $R^8$ may independently be hydrogen, alkyl, —O-alkyl, —OH, —S-alkyl, —SH, amino, amido, epoxy, carboxyl, acrylate, (meth)acrylate, cycloalkyl, aryl, alkaryl, polyether, alkenyl, or alkynyl; and n may be an integer from 0 to about 300; provided that at least one of $R^1$, $R^2$, $R^3$, $R^4$, $R^5$, $R^6$, $R^7$, and $R^8$ may be an alkenyl or alkynyl.

In paragraph [0104], $R^1$, $R^2$, $R^3$, $R^4$, $R^5$, $R^6$, $R^7$, and $R^8$ may independently be hydrogen, alkyl, —O-alkyl, acrylate, (meth)acrylate, aryl, alkaryl, alkenyl, or alkynyl.

In any one of paragraphs [0104]-[0105], at least one of $R^1$, $R^2$, $R^3$, $R^4$, $R^5$, $R^6$, $R^7$, and $R^8$ may be alkenyl.

In any one of paragraphs [0104]-[0106], $R^1$, $R^2$, $R^3$, $R^4$, $R^5$, $R^6$, $R^7$, and $R^8$ may independently be $C_1$-$C_6$ alkyl or $C_1$-$C_6$ alkenyl.

In any one of paragraphs [0104]-[0107], at least two of $R^1$, $R^2$, $R^3$, $R^4$, $R^5$, $R^6$, $R^7$, and $R^8$ may be alkenyl. In any embodiment, $R^1$, $R^3$, $R^4$, $R^5$, $R^6$, and $R^8$ may independently be $C_1$-$C_6$ alkyl.

In any one of paragraphs [0104]-[0108], $R^1$, $R^3$, $R^4$, $R^5$, $R^6$, and $R^8$ may independently be $C_1$-$C_3$ alkyl.

In any one of paragraphs [0104]-[0109], $R^1$, $R^3$, $R^4$, $R^5$, $R^6$, and $R^8$ may be methyl.

In any one of paragraphs [0104]-[0110], $R^2$ and $R^7$ may independently be $C_2$-$C_6$ alkenyl.

In any one of paragraphs [0104]-[0111], $R^2$ and $R^7$ may independently be $C_2$-$C_4$ alkenyl.

In any one of paragraphs [0104]-[0112], $R^2$ and $R^7$ may be —CH=CH_2.

In any one of paragraphs [0104]-[0113], n may be an integer from about 50 to about 150.

In any one of paragraphs [0104]-[0114], the monomer or the mixture of monomers may include ethylenically unsaturated monomers.

In any one of paragraphs [0104]-[0115], the monomer or the mixture of monomers may be selected from the group consisting of (meth)acrylic acid, (meth)acrylate, (meth)acrylamide, styreneated monomers, vinyl ester, and a combination of any two or more thereof.

In any one of paragraphs [0104]-[0116], the polymerization product may further include a cross-linkable monomer.

In any one of paragraphs [0104]-[0117], the cross-linkable monomer may include a functional group selected from the group consisting of a keto, carbonyl, anhydride, epoxy, and a combination of any two or more thereof.

In any one of paragraphs [0104]-[0118], the cross-linkable monomer may be selected from the group consisting of methyl vinyl ketone, ethyl vinyl ketone, butyl vinyl ketone, (meth)acrolein, crotonaldehyde, diacetone (meth)acrylamide, diacetone (meth)acrylate, mixed esters of aliphatic diols with (meth)acrylic acid or acetoacetic acid, diacetone acrylamide, diacetone methacrylamide acetoacetoxyethyl methacrylate (AAEM), maleic anhydride, itaconic anhydride, citraconic anhydride, diacetone acrylamide (DAAM), glycidyl meth(acrylate), β-methylglycidyl meth(acrylate), 3,4-epoxycyclohexylmethyl meth(acrylate), 3,4-epoxycyclohexylethyl meth(acrylate), 3,4-epoxycyclohexylpropyl meth (acrylate), allylglycidyl ether, N-methylol acrylamide, and oxidatively crosslinking monomers.

In any one of paragraphs [0104]-[0119], the cross-linkable monomer may be selected from the group consisting of acetoacetoxyethyl methacrylate (AAEM), diacetone acrylamide (DAAM), and a combination of any two or more thereof.

The present technology provides a siloxane-modified latex binder that may include a polymerization product of: a monomer or a mixture of monomers for producing a latex polymer comprising butyl (meth)acrylate, (meth)acrylic acid, methyl (meth)acrylate, styrene, or a combination of any two or more thereof; a non-hydrolyzable siloxane represented by Formula II:

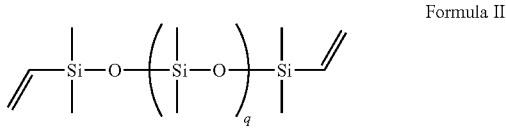

Formula II wherein q may be an integer from about 60 to about 120; and a cross-linkable monomer comprising acetoacetoxyethyl methacrylate (AAEM), diacetone acrylamide (DAAM), or a combination thereof.

In any one of paragraphs [0104]-[0121], the siloxane-modified latex binder may include about 0.05 wt % to about 5 wt % of the non-hydrolyzable siloxane.

In any one of paragraphs [0104]-[0122], the siloxane-modified latex binder may include about 0.1 wt % to about 1 wt % of the non-hydrolyzable siloxane.

In any one of paragraphs [0104]-[0123], the compositions may include water.

The technology also provides compositions that include the siloxane-modified latex binder described herein and water.

In any one of paragraphs [0104]-[0125], the compositions may be an aqueous based paint or coating.

In any one of paragraphs [0104]-[0126], the compositions may include one or more pigments.

In any one of paragraphs [0104]-[0127], the composition may include a neutralizing agent, a surfactant, an emulsifier, a dispersant, a pH adjuster, a polymer molecular weight control agent, a biocide, a preservative, a corrosion inhibitor, a rheology modifier, a coalescence aid, a leveling agent, a thickener, a co-solvent, a defoamer, a wet adhesion modifier, an oxidizer, a reducing agent, a UV absorber/protector, or a combination of any two or more thereof.

In any one of paragraphs [0104]-[0128], the composition may include one or more chain transfer agents.

In any one of paragraphs [0104]-[0129], the chain transfer agent may include an alkyl mercapto-ester.

In any one of paragraphs [0104]-[0130], the compositions may include a cross-linking agent.

In any one of paragraphs [0104]-[0131], the cross-linking agent may include a blocked cross-linking agent.

In any one of paragraphs [0104]-[0132], the blocked cross-linking agent comprises at least one hydrazone.

In any one of paragraphs [0104]-[0133], the cross-linking agent may include at least one hydrazine.

In any one of paragraphs [0104]-[0134], the cross-linking agent may include a compound of Formula III:

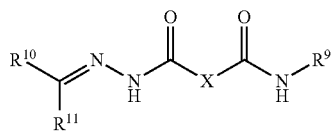

Formula III wherein: X may be a bond or divalent organic group; $R^9$ may be $NH_2$ or $N=C(R^{10})(R^{11})$; and $R^{10}$ and $R^{11}$ at each occurrence may independently be hydrogen or an organic group.

In any one of paragraphs [0104]-[0135], $R^{10}$ and $R^{11}$ at each occurrence may independently be an alkyl, alkenyl, or alkynyl; or $R^{10}$ and $R^{11}$ may be joined together to form a cycloalkyl.

In any one of paragraphs [0104]-[0136], $R^{10}$ and $R^{11}$ at each occurrence may independently be a $C_1$-$C_6$ alkyl.

In any one of paragraphs [0104]-[0137], X may be alkylene.

In any one of paragraphs [0104]-[0138], X may be $C_1$-$C_6$ alkylene.

The present technology provides paints or coatings that includes a physically coalesced and/or chemically cured composition of any one of paragraphs [0104]-[0139].

In any one of paragraphs [0104]-[0140], the paint or coating gloss measured at 60° may at least about 85 gloss units.

In any one of paragraphs [0104]-[0141], the paint or coating gloss measured at 60° may at least about 87 gloss units.

In any one of paragraphs [0104]-[0142], the paint or coating gloss measured at 60° may at least about 90 gloss units.

In any one of paragraphs [0104]-[0143], the paint or coating gloss measured at 20° may at least about 65 gloss units.

In any one of paragraphs [0104]-[0144], the paint or coating gloss measured at 20° may at least about 68 gloss units.

In any one of paragraphs [0104]-[0145], the paint or coating gloss measured at 20° may at least about 70 gloss units.

In any one of paragraphs [0104]-[0146], the paint or coating may exhibit a gloss retention of at least about 70% after 2000 hours.

In any one of paragraphs [0104]-[0147], the paint or coating may exhibit a gloss retention of at least about 80% after 2000 hours.

In any one of paragraphs [0104]-[0148], the paint or coating may exhibit a smooth, tactile surface.

The present technology also provides a method of producing a siloxane-modified latex binder, the method may include: polymerizing a monomer or a mixture of monomers to form a latex binder; contacting a non-hydrolyzable siloxane with the latex binder to produce a siloxane-modified latex binder; and polymerizing additional amounts of the monomer or the mixture of monomers.

In paragraph [0150], the non-hydrolyzable siloxane may be represented by Formula I:

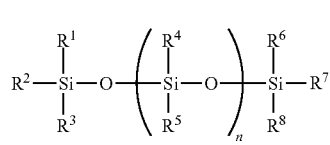

Formula I wherein: $R^1$, $R^2$, $R^3$, $R^4$, $R^5$, $R^6$, $R^7$, and $R^8$ may independently be hydrogen, alkyl, —O-alkyl, —OH, —S-alkyl, —SH, amino, amido, epoxy, carboxyl, acrylate, (meth) acrylate, cycloalkyl, aryl, alkaryl, polyether, alkenyl, or alkynyl; and n may be an integer from 0 to about 300; provided that at least one of $R^1$, $R^2$, $R^3$, $R^4$, $R^5$, $R^6$, $R^7$, and $R^8$ may be an alkenyl or alkynyl.

In any one of paragraphs [0150]-[0151], $R^1$, $R^2$, $R^3$, $R^4$, $R^5$, $R^6$, $R^7$, and $R^8$ may independently be hydrogen, alkyl, —O-alkyl, acrylate, (meth)acrylate, aryl, alkaryl, alkenyl, or alkynyl.

In any one of paragraphs [0150]-[0152], at least one of $R^1$, $R^2$, $R^3$, $R^4$, $R^5$, $R^6$, $R^7$, and $R^8$ may be alkenyl.

In any one of paragraphs [0150]-[0153], $R^1$, $R^2$, $R^3$, $R^4$, $R^5$, $R^6$, $R^7$, and $R^8$ may independently be $C_1$-$C_6$ alkyl or $C_1$-$C_6$ alkenyl.

In any one of paragraphs [0150]-[0154], at least two of $R^1$, $R^2$, $R^3$, $R^4$, $R^5$, $R^6$, $R^7$, and $R^8$ may be alkenyl. In any embodiment, $R^1$, $R^3$, $R^4$, $R^5$, $R^6$, and $R^8$ may independently be $C_1$-$C_6$ alkyl.

In any one of paragraphs [0150]-[0155], $R^1$, $R^3$, $R^4$, $R^5$, $R^6$, and $R^8$ may independently be $C_1$-$C_3$ alkyl.

In any one of paragraphs [0150]-[0156], $R^1$, $R^3$, $R^4$, $R^5$, $R^6$, and $R^8$ may be methyl.

In any one of paragraphs [0150]-[0157], $R^2$ and $R^7$ may independently be $C_2$-$C_6$ alkenyl.

In any one of paragraphs [0150]-[0158], $R^2$ and $R^7$ may independently be $C_2$-$C_4$ alkenyl.

In any one of paragraphs [0150]-[0159], $R^2$ and $R^7$ may be —CH=CH$_2$.

In any one of paragraphs [0150]-[0160], n may be an integer from about 50 to about 150.

In any one of paragraphs [0150]-[0161], the monomer or the mixture of monomers may include ethylenically unsaturated monomers.

In any one of paragraphs [0150]-[0162], the monomer or the mixture of monomers may be selected from the group consisting of (meth)acrylic acid, (meth)acrylate, (meth)acrylamide, styreneated monomers, vinyl ester, and a combination of any two or more thereof.

In any one of paragraphs [0150]-[0163], the polymerizing may be conducted at a temperature of about 65° C. to about 90° C.

In any one of paragraphs [0150]-[0164], the method may include polymerizing a cross-linkable monomer with the monomer or mixture of monomers at any step of the method. In any embodiment, the cross-linkable monomer may include a functional group selected from the group consisting of a keto, carbonyl, anhydride, epoxy, and a combination of any two or more thereof.

In any one of paragraphs [0150]-[0165], the cross-linkable monomer may include a functional group selected from the group consisting of a keto, carbonyl, anhydride, epoxy, and a combination of any two or more thereof.

In any one of paragraphs [0150]-[0166], the cross-linkable monomer may be selected from the group consisting of methyl vinyl ketone, ethyl vinyl ketone, butyl vinyl ketone, (meth)acrolein, crotonaldehyde, diacetone (meth)acrylamide, diacetone (meth)acrylate, mixed esters of aliphatic diols with (meth)acrylic acid or acetoacetic acid, diacetone acrylamide, diacetone methacrylamide acetoacetoxyethyl methacrylate (AAEM), maleic anhydride, itaconic anhydride, citraconic anhydride, diacetone acrylamide (DAAM), glycidyl meth(acrylate), β-methylglycidyl meth(acrylate), 3,4-epoxycyclohexylmethyl meth(acrylate), 3,4-epoxycyclohexylethyl meth(acrylate), 3,4-epoxycyclohexylpropyl meth (acrylate), allylglycidyl ether, N-methylol acrylamide, and oxidatively crosslinking monomers.

In any one of paragraphs [0150]-[0167], the cross-linkable monomer may be selected from the group consisting of acetoacetoxyethyl methacrylate (AAEM), diacetone acrylamide (DAAM), and a combination of any two or more thereof.

In any one of paragraphs [0150]-[0168], the polymerizing the monomer or a mixture of monomers to form the latex binder and/or the polymerizing the additional amounts of the monomer or the mixture of monomers may include adding one or more chain transfer agents to the monomer or a mixture of monomers.

In any one of paragraphs [0150]-[0169], the chain transfer agent may include an alkyl mercapto-ester.

EQUIVALENTS

While certain embodiments have been illustrated and described, a person with ordinary skill in the art, after reading the foregoing specification, can effect changes, substitutions of equivalents and other types of alterations to the compositions of the present technology as set forth herein. Each aspect and embodiment described above can also have included or incorporated therewith such variations or aspects as disclosed in regard to any or all of the other aspects and embodiments.

The present technology is also not to be limited in terms of the particular aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to particular methods, reagents, compounds, or compositions, which can, of course, vary. It is also to be understood that the terminology used herein is for the purpose of describing particular aspects only, and is not intended to be limiting. Thus, it is intended that the specification be considered as illustrative only with the breadth, scope and spirit of the present technology indicated only by the appended claims, definitions therein and any equivalents thereof.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the technology. This includes the generic description of the technology with a proviso or negative limitation removing any subject matter from the genus, regardless of whether or not the excised material is specifically recited herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims, along with the full scope of equivalents to which such claims are entitled.

What is claimed is:

1. A siloxane-modified latex binder comprising a polymerization product of a monomer or a mixture of monomers for producing a latex polymer and a non-hydrolyzable siloxane,
wherein the non-hydrolyzable siloxane is represented by Formula I:

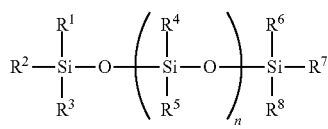

Formula I wherein:
$R^1$, $R^3$, $R^4$, $R^5$, $R^6$, and $R^8$ are independently $C_1$-$C_6$ alkyl;
$R^2$ and $R^7$ are independently hydrogen, alkyl, —O-alkyl, —OH, —S-alkyl, —SH, amino, amido, epoxy, carboxyl, acrylate, (meth)acrylate, cycloalkyl, aryl, alkaryl, polyether, alkenyl, or alkynyl; and
n is an integer from 0 to about 300;
provided that at least one of $R^2$ and $R^7$ is an alkenyl or alkynyl.

2. The siloxane-modified latex binder of claim 1, wherein $R^1$, $R^3$, $R^4$, $R^5$, $R^6$, and $R^8$ are methyl.

3. The siloxane-modified latex binder of claim 1, wherein $R^2$ and $R^7$ are independently $C_2$-$C_6$ alkenyl.

4. The siloxane-modified latex binder of claim 1, wherein n is an integer from about 50 to about 150.

5. A composition comprising a cross-linking agent and the siloxane-modified latex binder of claim 1, wherein:
the siloxane-modified latex binder further comprises a cross-linkable monomer; and
the cross-linking agent comprises a compound of Formula III:

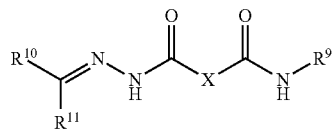

Formula III wherein:
X is a bond or divalent organic group;
$R^9$ is $NH_2$ or $N=C(R^{10})(R^{11})$;
and $R^{10}$ and $R^{11}$ at each occurrence are independently hydrogen or an organic group.

6. The composition of claim 5, wherein the cross-linkable monomer is selected from the group consisting of methyl vinyl ketone, ethyl vinyl ketone, butyl vinyl ketone, (meth)acrolein, crotonaldehyde, diacetone (meth)acrylamide, diacetone (meth)acrylate, mixed esters of aliphatic diols with (meth)acrylic acid or acetoacetic acid, diacetone acrylamide, diacetone methacrylamide acetoacetoxyethyl methacrylate (AAEM), maleic anhydride, itaconic anhydride, citraconic anhydride, diacetone acrylamide (DAAM), glycidyl meth(acrylate), β-methylglycidyl meth(acrylate), 3,4-epoxycyclohexylmethyl meth(acrylate), 3,4-epoxycyclohexylethyl meth(acrylate), 3,4-epoxycyclohexylpropyl meth(acrylate), allylglycidyl ether, N-methylol acrylamide, and oxidatively crosslinking monomers.

7. The composition of claim 6, wherein the cross-linkable monomer is selected from the group consisting of acetoacetoxyethyl methacrylate (AAEM), diacetone acrylamide (DAAM), and a combination of any two or more thereof.

8. The composition of claim 5 comprising about 0.05 wt % to about 5 wt % of the non-hydrolyzable siloxane.

9. The composition of claim 5 further comprising one or more chain transfer agents.

10. The composition of claim 5 further comprising water, wherein the composition is an aqueous based paint or coating.

11. A paint or coating comprising a physically coalesced and/or chemically cured composition of claim 10.

12. The paint or coating of claim 11, wherein the paint or coating gloss measured at 60° is at least about 85 gloss units, the paint or coating gloss measured at 20° is at least about 65 gloss units, or both.

13. The paint or coating of claim 11, wherein the paint or coating exhibits a gloss retention of at least about 70% after 2000 hours.

14. The paint or coating of claim 11, wherein the paint or coating exhibits a smooth, tactile surface.

15. The composition of claim 5, wherein $R^{10}$ and $R^{11}$ at each occurrence are independently a $C_1$-$C_6$ alkyl and X is $C_1$-$C_6$ alkylene.

16. A method of producing the siloxane-modified latex binder of claim 1, the method comprising:
polymerizing the monomer or a mixture of monomers to form a latex binder;
contacting the non-hydrolyzable siloxane with the latex binder to produce the siloxane-modified latex binder; and
polymerizing additional amounts of the monomer or the mixture of monomers.

17. A siloxane-modified latex binder comprising a polymerization product of:
a monomer or a mixture of monomers for producing a latex polymer comprising butyl (meth)acrylate, (meth)acrylic acid, methyl (meth)acrylate, styrene, or a combination of any two or more thereof;
a non-hydrolyzable siloxane represented by Formula II:

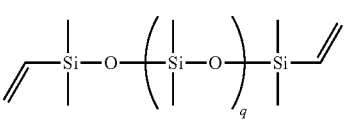

Formula II wherein q is an integer from about 60 to about 120; and
a cross-linkable monomer comprising acetoacetoxyethyl methacrylate (AAEM), diacetone acrylamide (DAAM), or a combination thereof.

* * * * *